United States Patent
Xu et al.

(10) Patent No.: US 12,494,256 B2
(45) Date of Patent: Dec. 9, 2025

(54) ADAPTIVE ERASE SCHEME FOR A MEMORY DEVICE

(71) Applicant: Sandisk Technologies, Inc., Milpitas, CA (US)

(72) Inventors: Huiwen Xu, Cupertino, CA (US); Bo Lei, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 168 days.

(21) Appl. No.: 18/222,787

(22) Filed: Jul. 17, 2023

(65) Prior Publication Data

US 2024/0257881 A1    Aug. 1, 2024

Related U.S. Application Data

(60) Provisional application No. 63/442,149, filed on Jan. 31, 2023.

(51) Int. Cl.
  *G11C 16/16* (2006.01)
  *G11C 16/08* (2006.01)
  *G11C 16/34* (2006.01)

(52) U.S. Cl.
  CPC .............. *G11C 16/16* (2013.01); *G11C 16/08* (2013.01); *G11C 16/3445* (2013.01)

(58) Field of Classification Search
  CPC ..... G11C 16/16; G11C 16/08; G11C 16/3445; G11C 16/0483
  See application file for complete search history.

(56) References Cited

U.S. PATENT DOCUMENTS

| | | | |
|---|---|---|---|
| 8,730,738 B2* | 5/2014 | Oh | G11C 16/3454 365/185.23 |
| 8,767,478 B2* | 7/2014 | Shiino | G11C 16/3445 365/185.29 |
| 9,256,530 B2* | 2/2016 | Oh | G06F 12/0246 |
| 10,109,360 B2* | 10/2018 | Lee | G11C 16/26 |
| 2024/0184458 A1* | 6/2024 | Oh | G06F 3/0659 |

* cited by examiner

*Primary Examiner* — Jerome Leboeuf
*Assistant Examiner* — Christopher Lane Reece
(74) *Attorney, Agent, or Firm* — Dickinson Wright PLLC

(57) ABSTRACT

The adaptive erase scheme includes erasing the memory cells of a selected memory block in at least one erase loop. During the at least one erase loop, simultaneously, an erase voltage is applied to a plurality of channels in the selected memory block, a first bias voltage is applied to the plurality of word lines of the first sub-block, and a second bias voltage is applied to the plurality of word lines of the second sub-block. The first bias voltage is different than the second bias voltage so that the memory cells of the first and second sub-blocks are erased at different speeds.

12 Claims, 20 Drawing Sheets

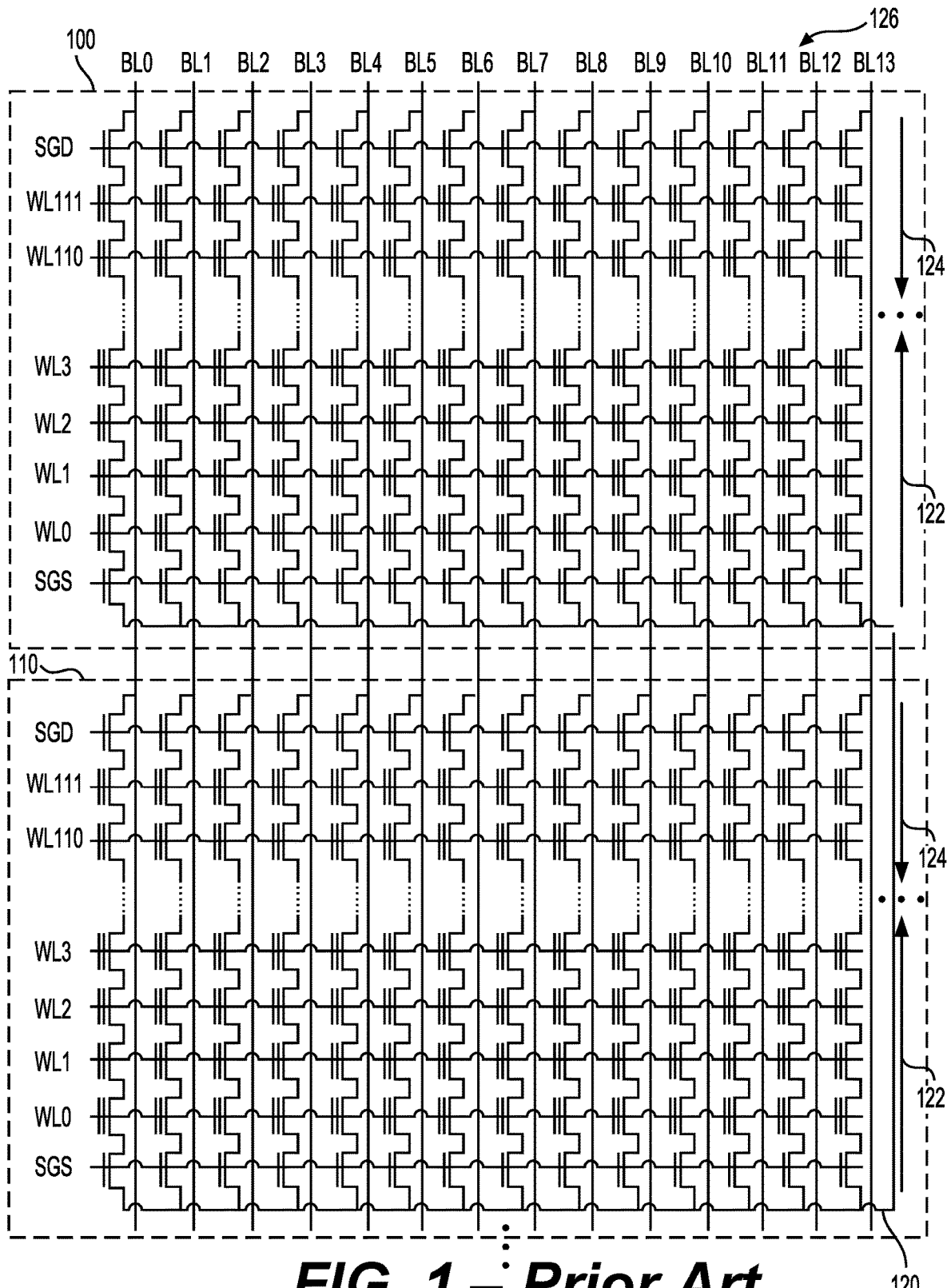
*FIG. 1 – Prior Art*

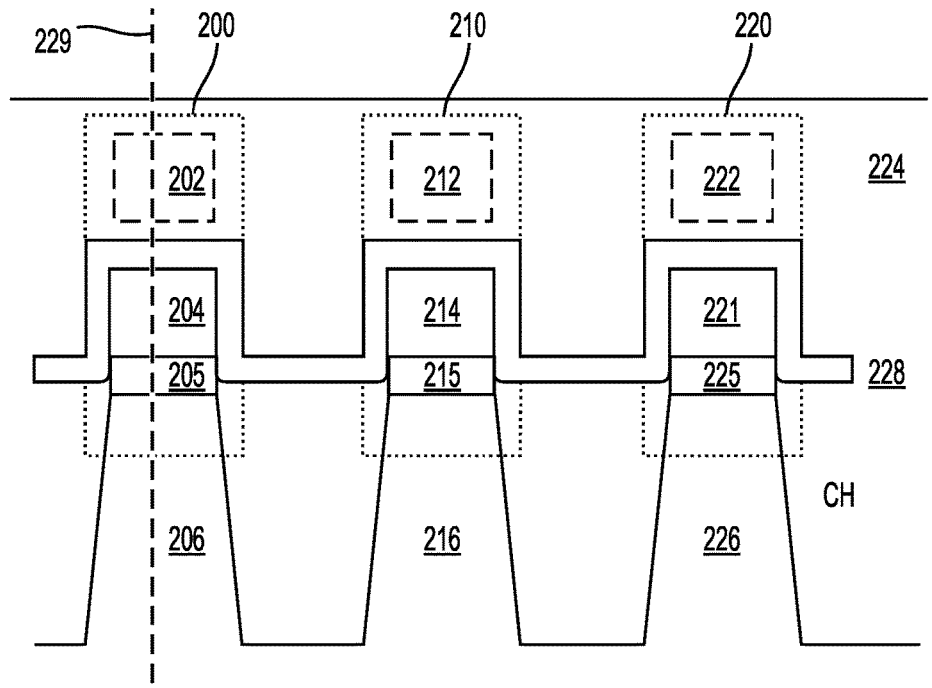
FIG. 2A - Prior Art
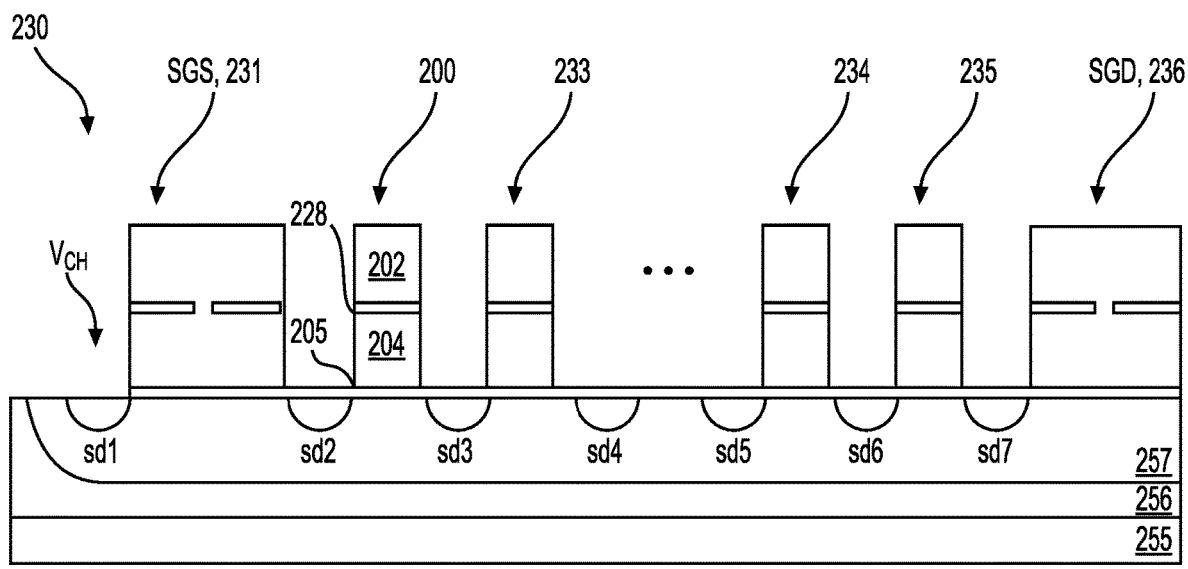
FIG. 2B – Prior Art

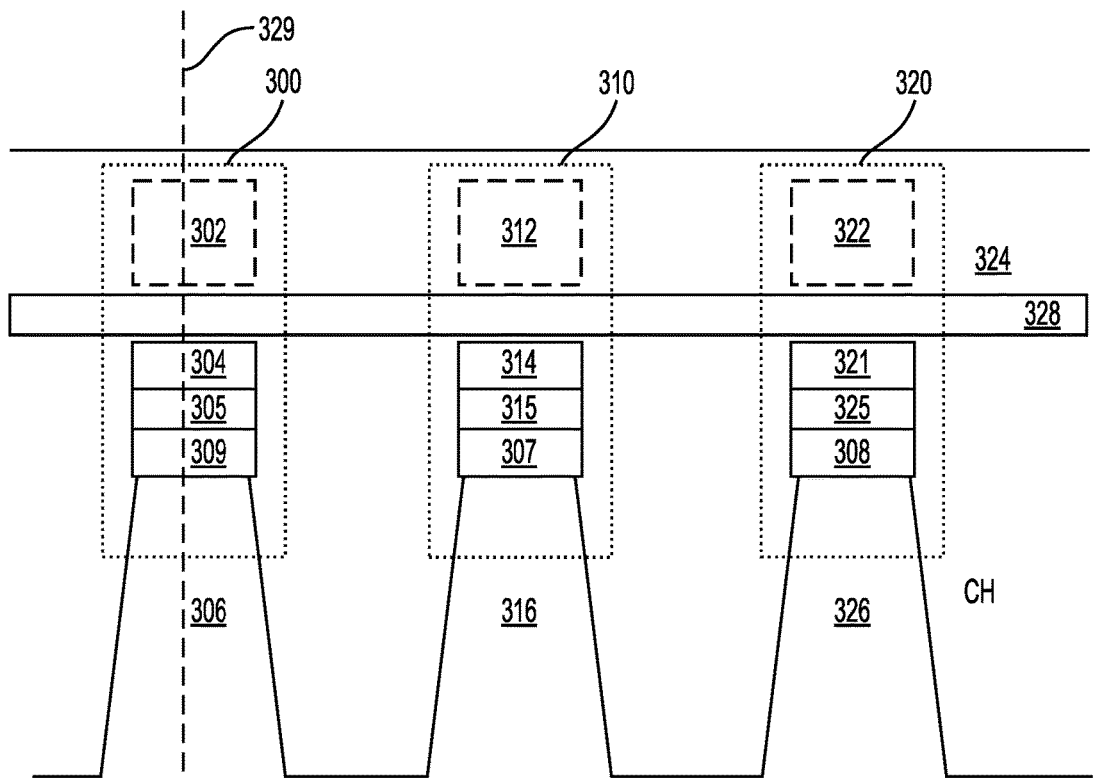
FIG. 3A – Prior Art
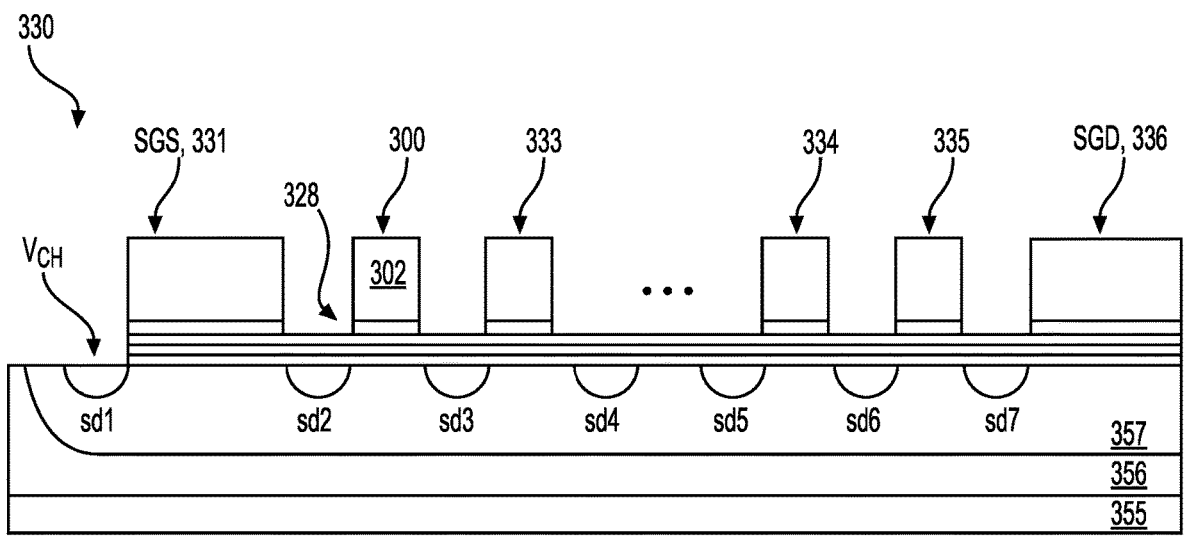
FIG. 3B – Prior Art

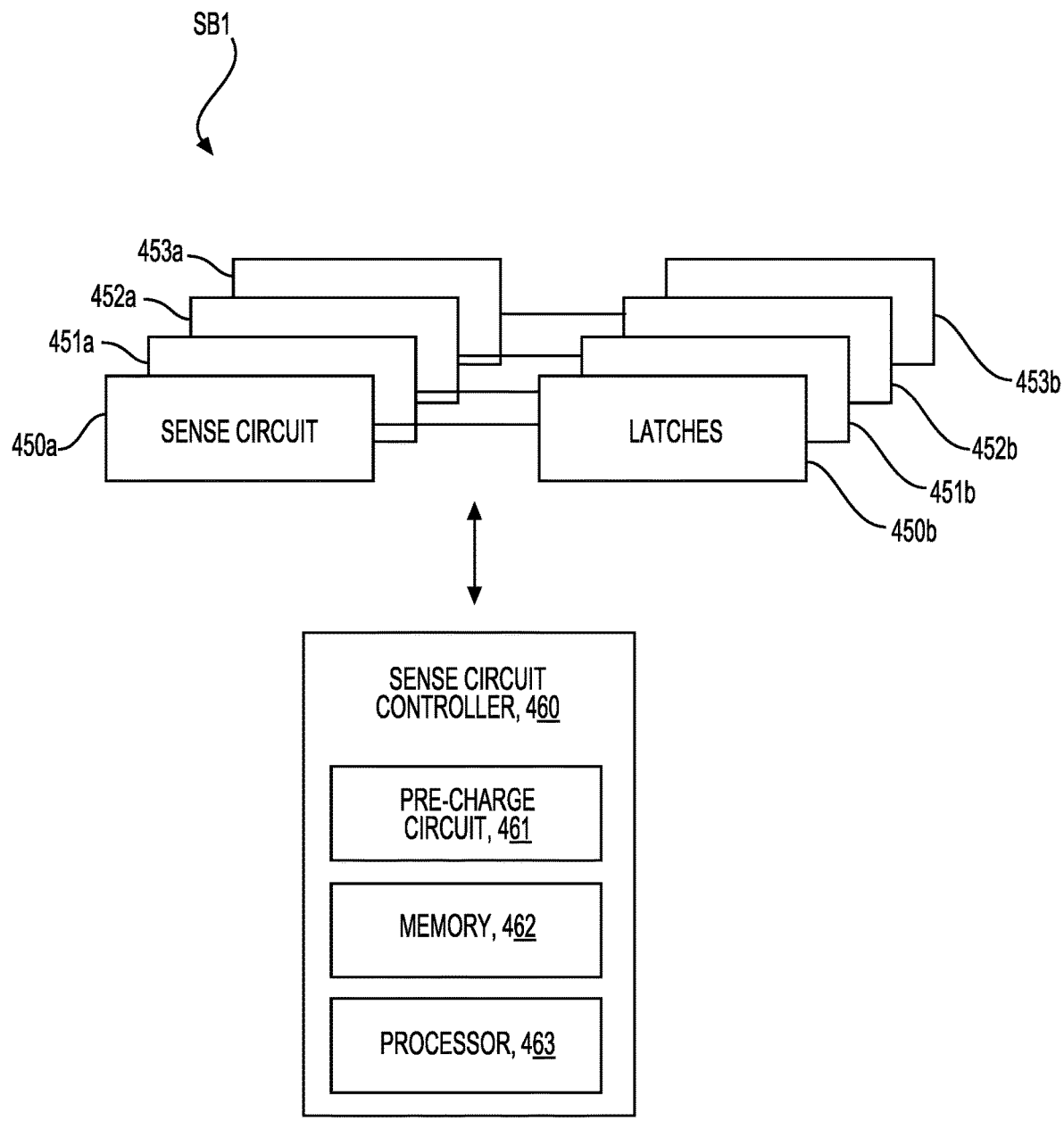
FIG. 4 – Prior Art

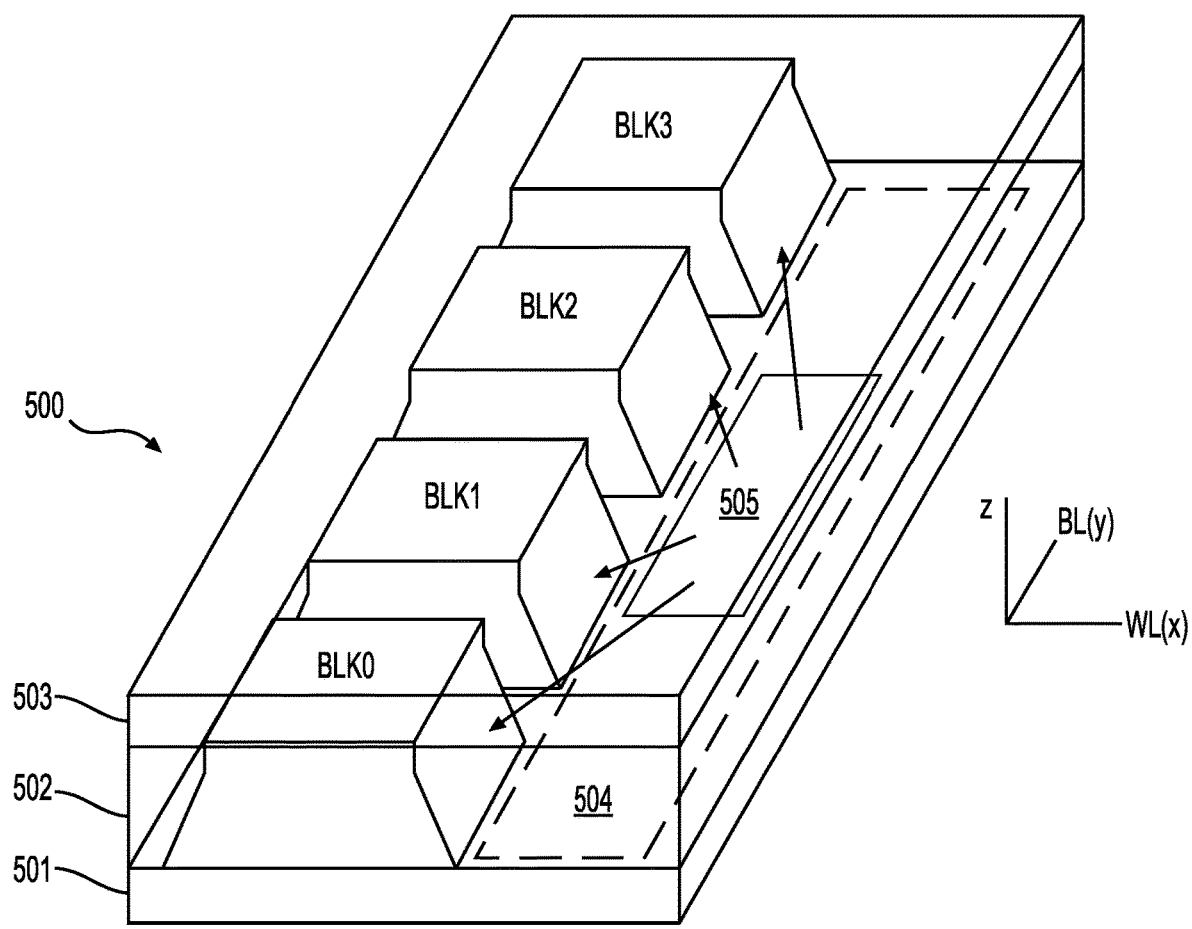
FIG. 5A – Prior Art

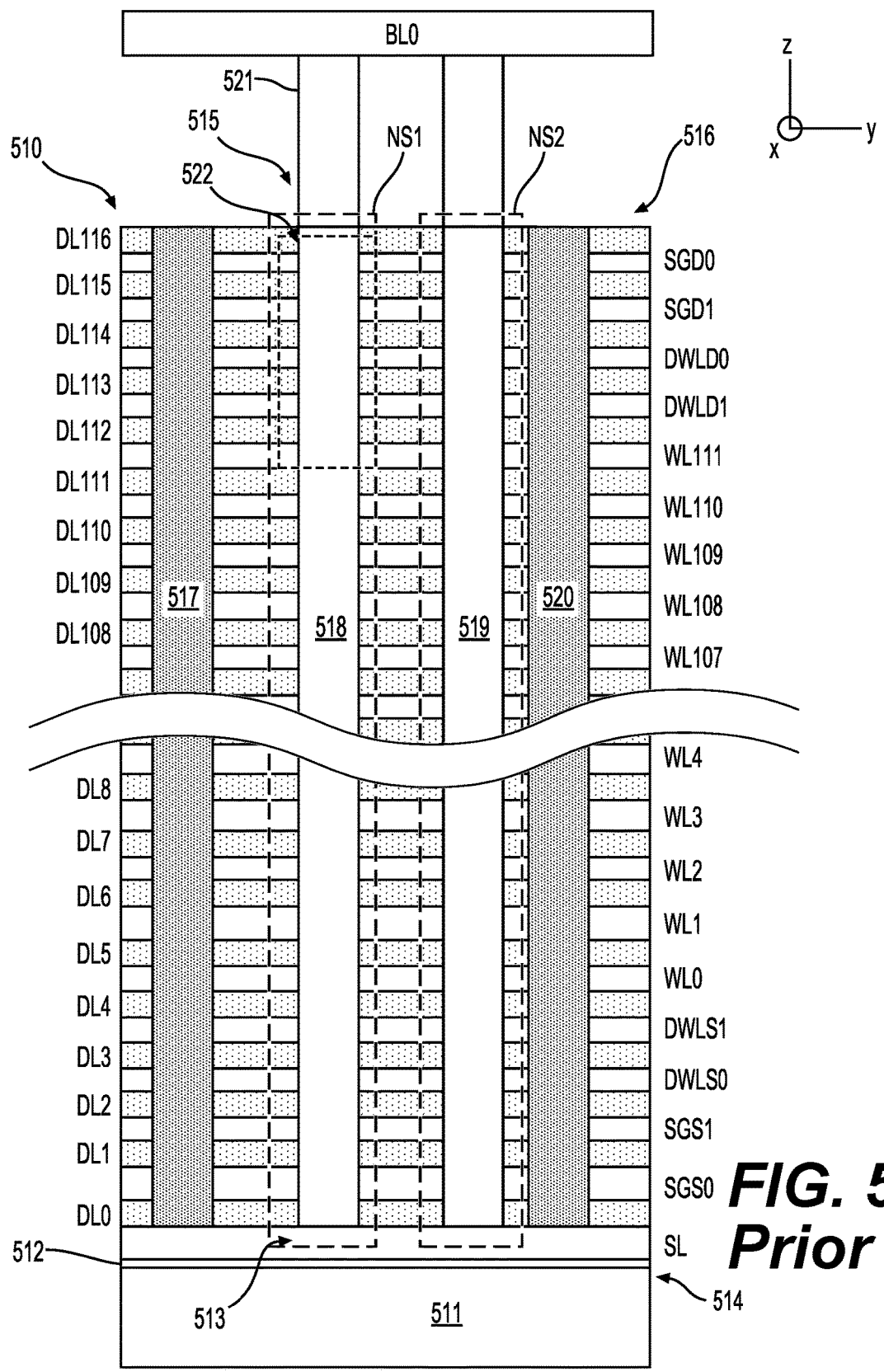
FIG. 5B - Prior Art

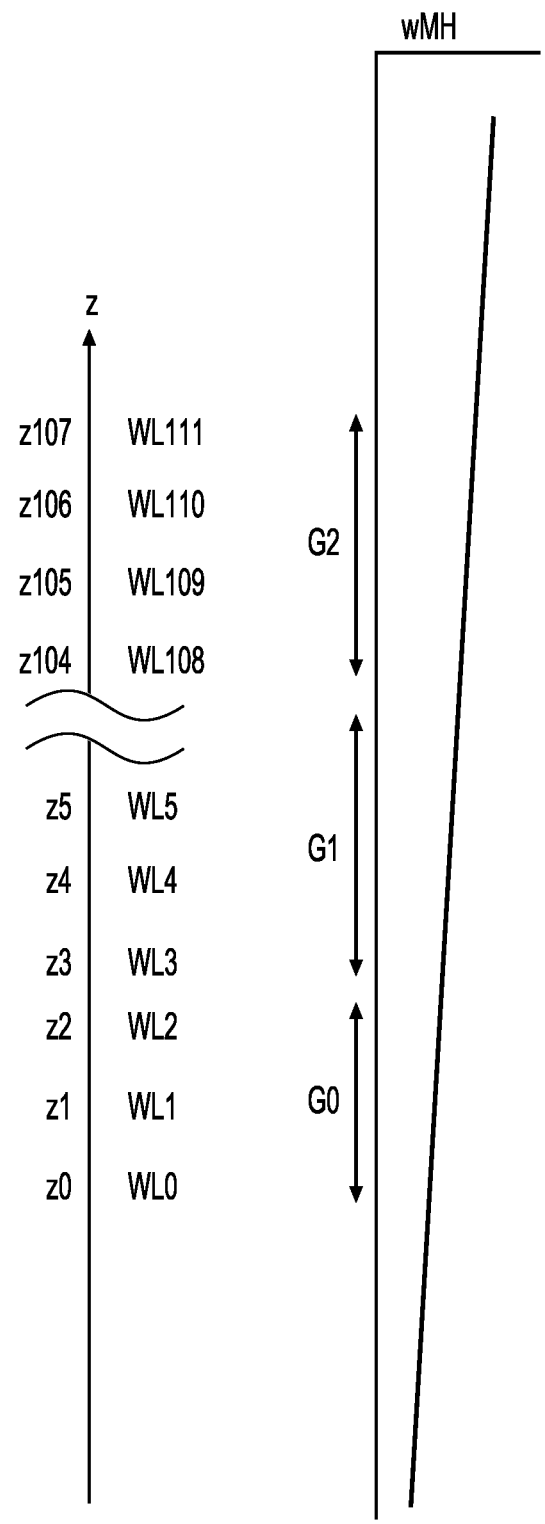
FIG. 5C – Prior Art

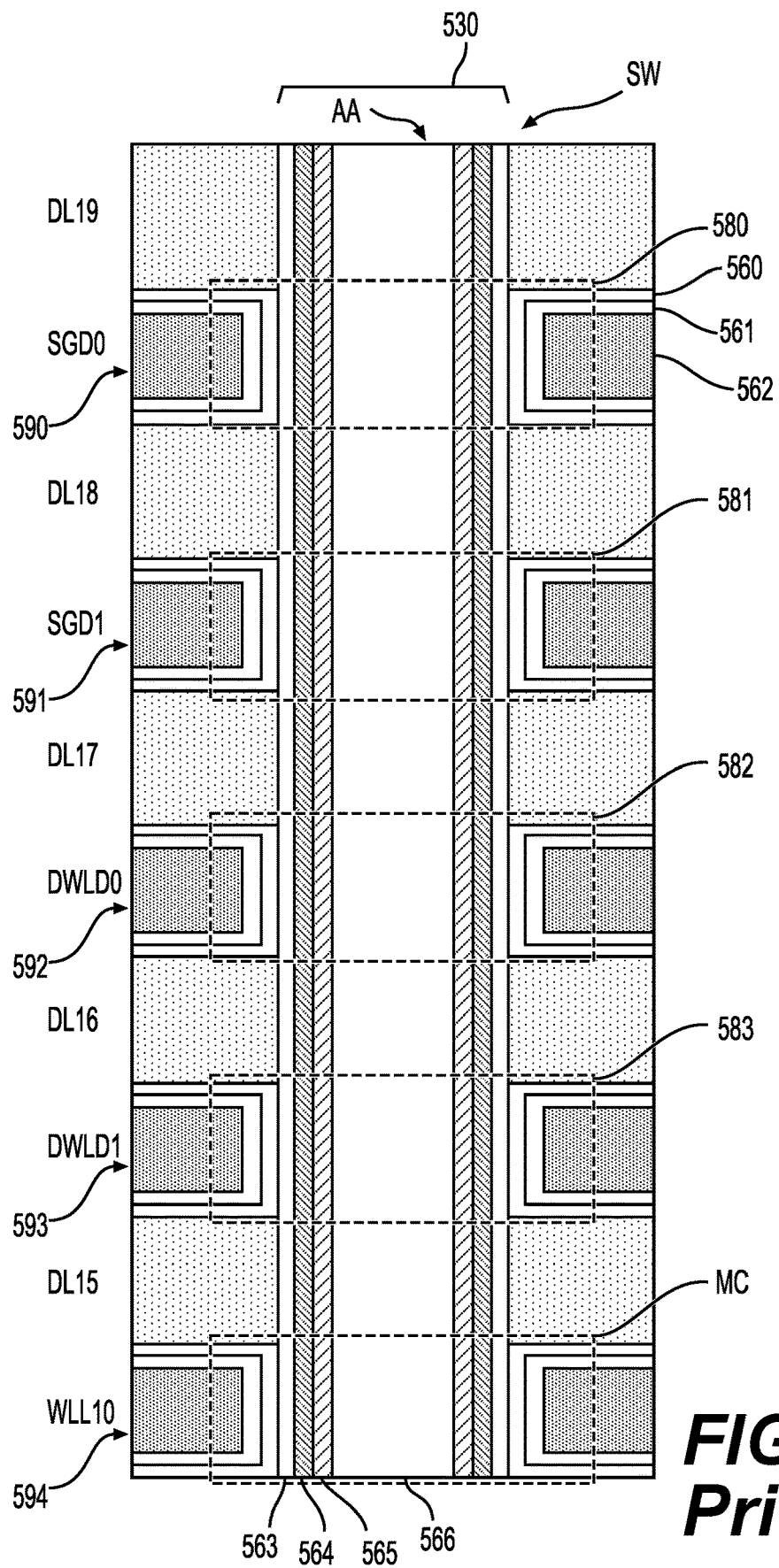
FIG. 5D – Prior Art

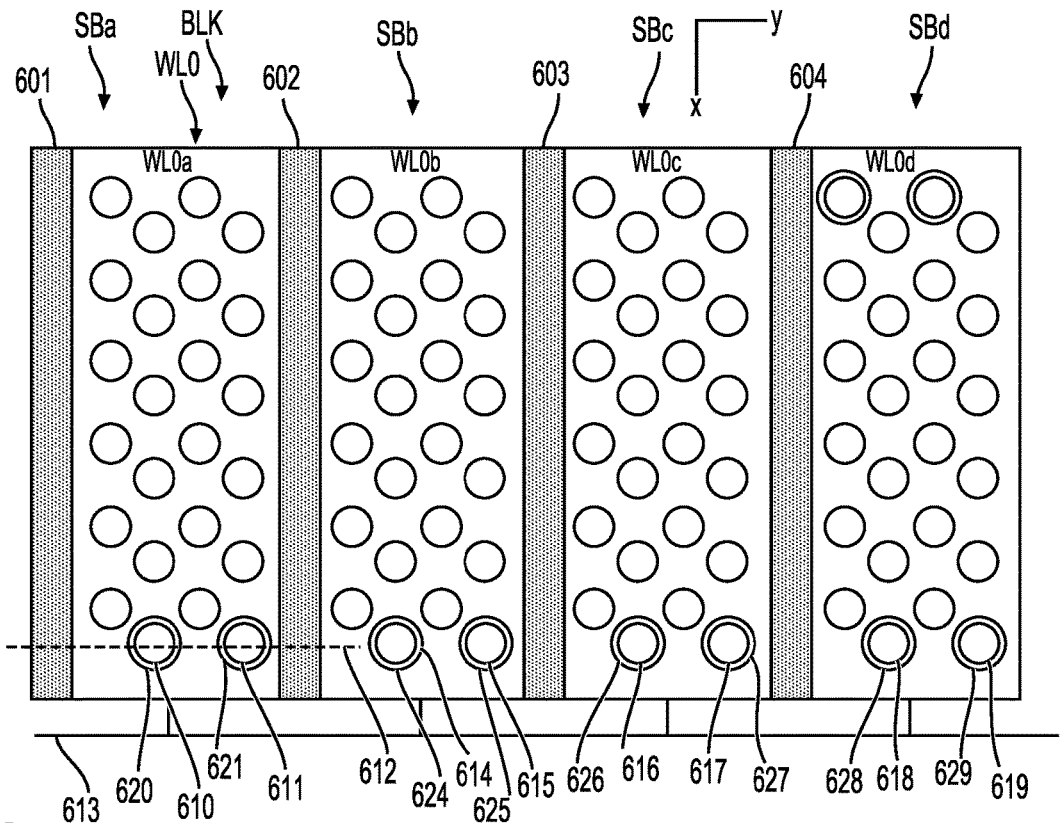
*FIG. 6A – Prior Art*
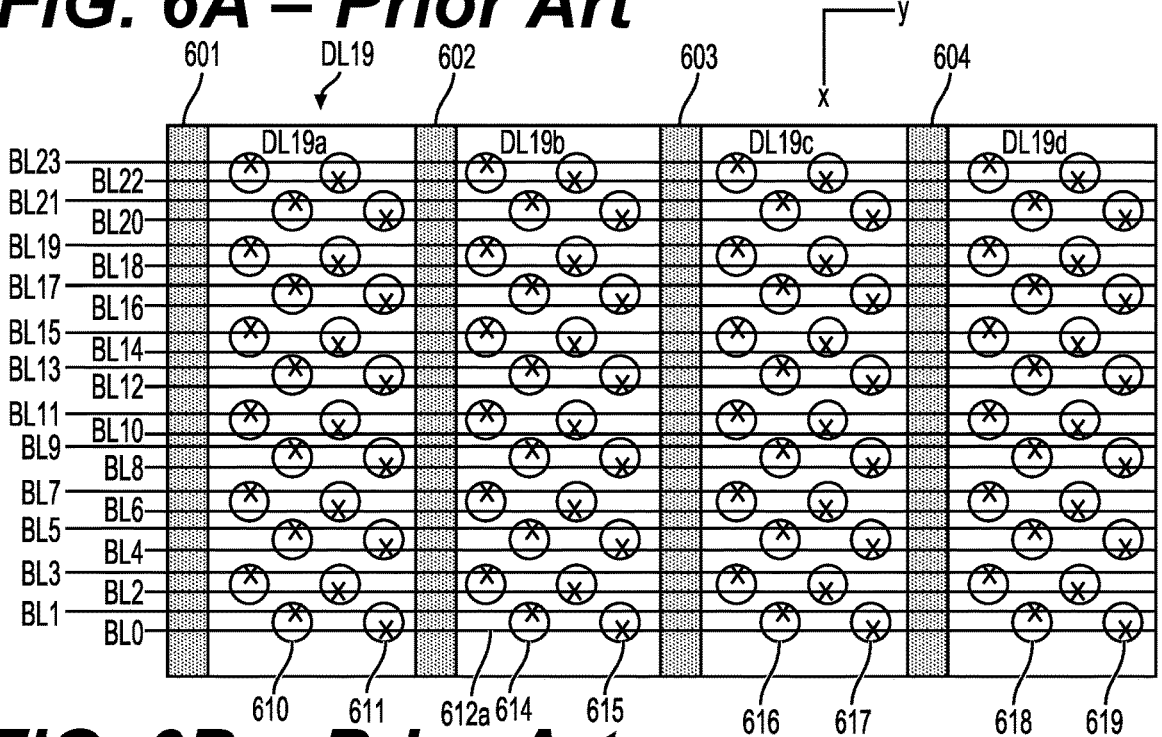
*FIG. 6B – Prior Art*

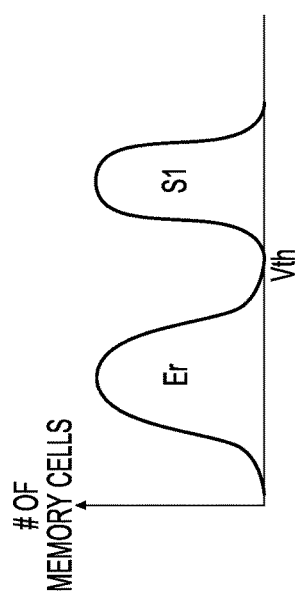
FIG. 7 – Prior Art
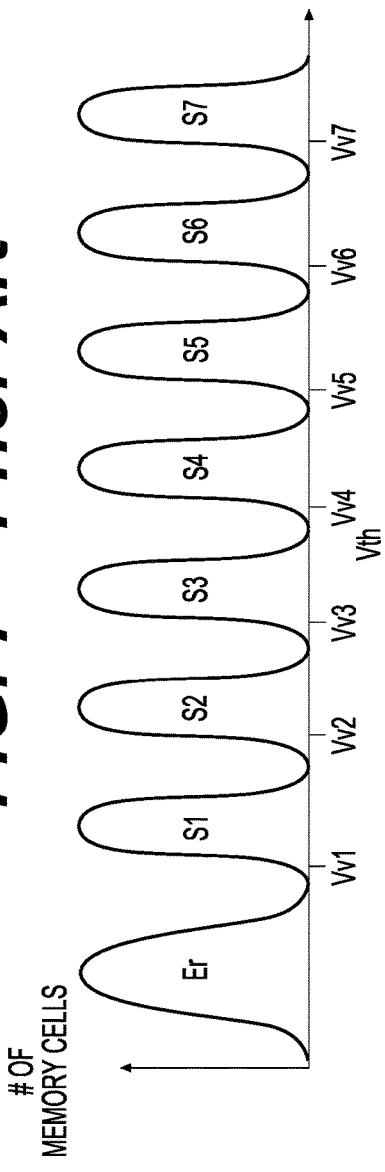
FIG. 8 – Prior Art
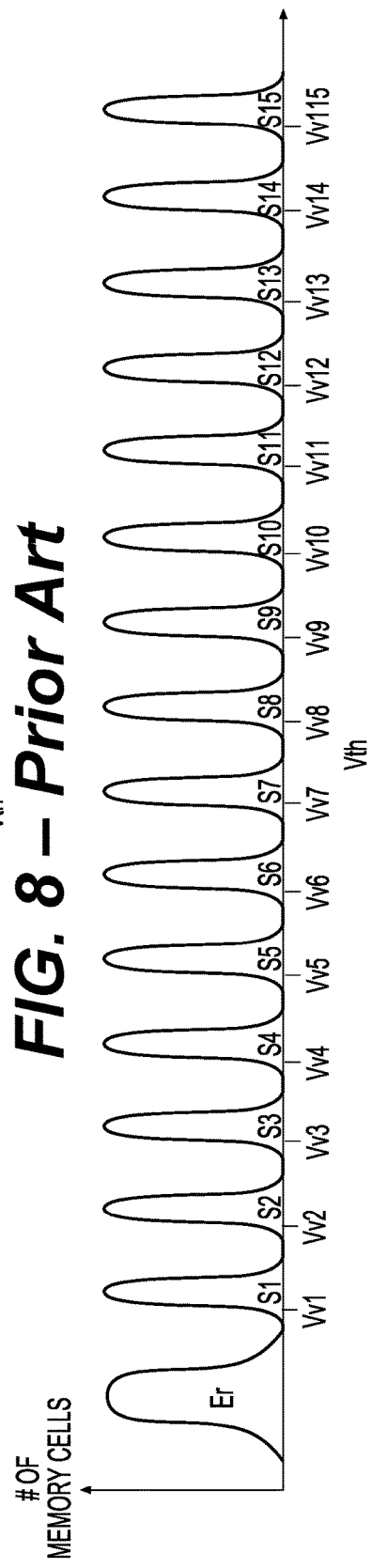
FIG. 9 – Prior Art

| | ERASE | ERASE VERIFY |
|---|---|---|
| BIT LINE | FLOATING | FLOATING |
| SGD | FLOATING | $V_{SG}$ |
| WLn | 0V | 0V |
| WLn-1 | 0V | 0V |
| • | 0V | 0V |
| • | 0V | 0V |
| WLi | 0V | 0V |
| • | 0V | 0V |
| • | 0V | 0V |
| WL1 | 0V | 0V |
| WLD | 0V | 0V |
| SGS | FLOATING | $V_{SGS}$ |
| SOURCE LINE | FLOATING | $V_{DD}$ |
| P-w0i | $V_{ERASE}$ | 0V |

*FIG. 11*

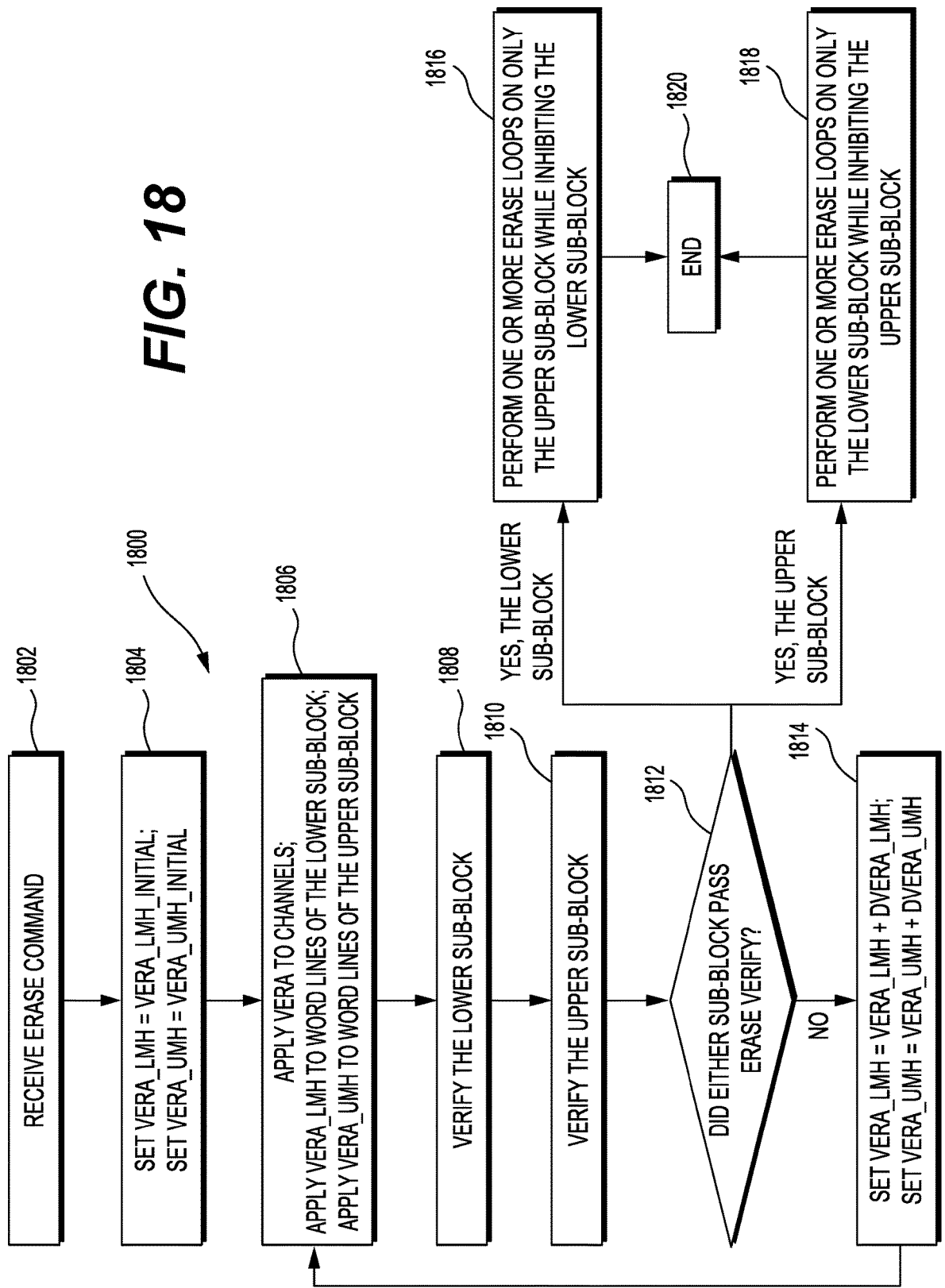

ADAPTIVE ERASE SCHEME FOR A MEMORY DEVICE

CROSS-REFERENCE TO RELATED APPLICATIONS

This application claims the benefit of U.S. Provisional Application No. 63/442,149, filed on Jan. 31, 2023. The entire disclosures of the applications referenced above are incorporated herein by reference.

BACKGROUND

1. Field

The present disclosure is related to techniques for erasing the memory cells of a memory device.

2. Related Art

Semiconductor memory is widely used in various electronic devices, such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power, e.g., a battery.

NAND is one type of non-volatile memory, and a NAND memory device typically includes a chip with a plurality of memory blocks, each of which includes an array of memory cells arranged in a plurality of word lines. A pair of example memory blocks 100, 110 are illustrated in a FIG. 1. In this example, the memory blocks 100, 110 have a two-dimensional configuration. A memory array in the chip can include many such blocks 100, 110. Each example block 100, 110 includes a number of NAND strings and respective bit lines, e.g., BL0, BL1, . . . which are shared among the blocks. Each NAND string is connected at one end to a drain-side select gate (SGD), and the control gates of the drain select gates are connected via a common SGD line. The NAND strings are connected at their other end to a source-side select gate (SGS) which, in turn, is connected to a common source line 120. One hundred and twelve word lines (WL0-WL111), for example, extend between the SGSs and the SGDs. In some embodiments, the memory block may include more or fewer than one hundred and twelve word lines. For example, in some embodiments, a memory block includes one hundred and sixty-four word lines. In some cases, dummy word lines, which contain no user data, can also be used in the memory array adjacent to the select gate transistors. Such dummy word lines can shield the edge data word line from certain edge effects.

One type of non-volatile memory which may be provided in the memory array is a floating gate memory, such as of the type shown in FIGS. 2A and 2B. However, other types of non-volatile memory can also be used. As discussed in further detail below, in another example shown in FIGS. 3A and 3B, a charge-trapping memory cell uses a non-conductive dielectric material in place of a conductive floating gate to store charge in a non-volatile manner. A triple layer dielectric formed of silicon oxide, silicon nitride and silicon oxide ("ONO") is sandwiched between a conductive control gate and a surface of a semi-conductive substrate above the memory cell channel. The memory cell is programmed by injecting electrons from the cell channel into the nitride, where they are trapped and stored in a limited region. This stored charge then changes the threshold voltage Vt of a portion of the channel of the cell in a manner that is detectable. The memory cell is erased by injecting hot holes into the nitride. A similar cell can be provided in a split-gate configuration where a doped polysilicon gate extends over a portion of the memory cell channel to form a separate select transistor.

In another approach, NROM cells are used. Two bits, for example, are stored in each NROM cell, where an ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric. Other types of non-volatile memory are also known.

FIG. 2A illustrates a cross-sectional view of example floating gate memory cells 200, 210, 220 in NAND strings. In this Figure, a bit line or NAND string direction goes into the page, and a word line direction goes from left to right. As an example, word line 224 extends across NAND strings which include respective channel regions 206, 216 and 226. The memory cell 200 includes a control gate 202, a floating gate 204, a tunnel oxide layer 205 and the channel region 206. The memory cell 210 includes a control gate 212, a floating gate 214, a tunnel oxide layer 215 and the channel region 216. The memory cell 220 includes a control gate 222, a floating gate 221, a tunnel oxide layer 225 and the channel region 226. Each memory cell 200, 210, 220 is in a different respective NAND string. An inter-poly dielectric (IPD) layer 228 is also illustrated. The control gates 202, 212, 222 are portions of the word line. A cross-sectional view along contact line connector 229 is provided in FIG. 2B.

The control gate 202, 212, 222 wraps around the floating gate 204, 214, 221, increasing the surface contact area between the control gate 202, 212, 222 and floating gate 204, 214, 221. This results in higher IPD capacitance, leading to a higher coupling ratio which makes programming and erase easier. However, as NAND memory devices are scaled down, the spacing between neighboring cells 200, 210, 220 becomes smaller so there is almost no space for the control gate 202, 212, 222 and the IPD layer 228 between two adjacent floating gates 202, 212, 222.

As an alternative, as shown in FIGS. 3A and 3B, the flat or planar memory cell 300, 310, 320 has been developed in which the control gate 302, 312, 322 is flat or planar; that is, it does not wrap around the floating gate and its only contact with the IPD layer 328 is from above it. In this case, there is no advantage in having a tall floating gate. Instead, the floating gate is made much thinner. Further, the floating gate can be used to store charge, or a thin charge trap layer can be used to trap charge. This approach can avoid the issue of ballistic electron transport, where an electron can travel through the floating gate after tunneling through the tunnel oxide during programming.

FIG. 3A depicts a cross-sectional view of example charge-trapping memory cells 300, 310, 320 in NAND strings. The view is in a word line direction of memory cells 300, 310, 320 comprising a flat control gate and charge-trapping regions as a two-dimensional example of memory cells 300, 310, 320 in the memory cell array 126. Charge-trapping memory can be used in NOR and NAND flash memory device. This technology uses an insulator such as an SiN film to store electrons, in contrast to a floating-gate MOSFET technology which uses a conductor such as doped polycrystalline silicon to store electrons. As an example, a word line 324 extends across NAND strings which include respective channel regions 306, 316, 326. Portions of the word line provide control gates 302, 312, 322. Below the word line is an IPD layer 328, charge-trapping layers 304, 314, 321, polysilicon layers 305, 315, 325, and tunneling layers 309, 307, 308. Each charge-trapping layer 304, 314, 321 extends continuously in a respective NAND string. The flat configuration of the control gate can be made thinner than a floating gate. Additionally, the memory cells can be placed closer together.

FIG. 3B illustrates a cross-sectional view of the structure of FIG. 3A along contact line connector 329. The NAND string 330 includes an SGS transistor 331, example memory cells 300, 333, . . . 335, and an SGD transistor 336. Passageways in the IPD layer 328 in the SGS and SGD transistors 331, 336 allow the control gate layers 302 and floating gate layers to communicate. The control gate 302 and floating gate layers may be polysilicon and the tunnel oxide layer may be silicon oxide, for instance. The IPD layer 328 can be a stack of nitrides (N) and oxides (O) such as in a N—O—N—O—N configuration.

The NAND string may be formed on a substrate which comprises a p-type substrate region 355, an n-type well 356 and a p-type well 357. N-type source/drain diffusion regions sd1, sd2, sd3, sd4, sd5, sd6 and sd7 are formed in the p-type well. A channel voltage, Vch, may be applied directly to the channel region of the substrate.

FIG. 4 illustrates an example block diagram of a sense block SB1 in a memory chip. In one approach, a sense block comprises multiple sense circuits. Each sense circuit is associated with data latches. For example, the example sense circuits 450a, 451a, 452a, and 453a are associated with the data latches 450b, 451b, 452b, and 453b, respectively. In one approach, different subsets of bit lines can be sensed using different respective sense blocks. This allows the processing load which is associated with the sense circuits to be divided up and handled by a respective processor in each sense block. For example, a sense circuit controller 460 in SB1 can communicate with the set of sense circuits and latches. The sense circuit controller 460 may include a pre-charge circuit 461 which provides a voltage to each sense circuit for setting a pre-charge voltage. In one possible approach, the voltage is provided to each sense circuit independently, e.g., via the data bus and a local bus. In another possible approach, a common voltage is provided to each sense circuit concurrently. The sense circuit controller 460 may also include a pre-charge circuit 461, a memory 462 and a processor 463. The memory 462 may store code which is executable by the processor to perform the functions described herein. These functions can include reading the latches 450b, 451b, 452b, 453b which are associated with the sense circuits 450a, 451a, 452a, 453a, setting bit values in the latches and providing voltages for setting pre-charge levels in sense nodes of the sense circuits 450a, 451a, 452a, 453a. Further example details of the sense circuit controller 460 and the sense circuits 450a, 451a, 452a, 453a are provided below.

In some embodiments, a memory cell may include a flag register that includes a set of latches storing flag bits. In some embodiments, a quantity of flag registers may correspond to a quantity of data states. In some embodiments, one or more flag registers may be used to control a type of verification technique used when verifying memory cells. In some embodiments, a flag bit's output may modify associated logic of the device, e.g., address decoding circuitry, such that a specified block of cells is selected. A bulk operation (e.g., an erase operation, etc.) may be carried out using the flags set in the flag register, or a combination of the flag register with the address register, as in implied addressing, or alternatively by straight addressing with the address register alone.

FIG. 5A is a perspective view of a set of blocks 500 in an example three-dimensional configuration. On the substrate are example blocks BLK0, BLK1, BLK2, BLK3 of memory cells (storage elements) and a peripheral area 504 with circuitry for use by the blocks BLK0, BLK1, BLK2, BLK3. For example, the circuitry can include voltage drivers 505 which can be connected to control gate layers of the blocks BLK0, BLK1, BLK2, BLK3. In one approach, control gate layers at a common height in the blocks BLK0, BLK1, BLK2, BLK3 are commonly driven. The substrate 501 can also carry circuitry under the blocks BLK0, BLK1, BLK2, BLK3, along with one or more lower metal layers which are patterned in conductive paths to carry signals of the circuitry. The blocks BLK0, BLK1, BLK2, BLK3 are formed in an intermediate region 502 of the memory device. In an upper region 503 of the memory device, one or more upper metal layers are patterned in conductive paths to carry signals of the circuitry. Each block BLK0, BLK1, BLK2, BLK3 comprises a stacked area of memory cells, where alternating levels of the stack represent word lines. In one possible approach, each block BLK0, BLK1, BLK2, BLK3 has opposing tiered sides from which vertical contacts extend upward to an upper metal layer to form connections to conductive paths. While four blocks BLK0, BLK1, BLK2, BLK3 are illustrated as an example, two or more blocks can be used, extending in the x- and/or y-directions.

In one possible approach, the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device.

FIG. 5B illustrates an example cross-sectional view of a portion of one of the blocks BLK0, BLK1, BLK2, BLK3 of FIG. 5A. The block comprises a stack 510 of alternating conductive and dielectric layers. In this example, the conductive layers comprise two SGD layers, two SGS layers and four dummy word line layers DWLD0, DWLD1, DWLS0 and DWLS1, in addition to data word line layers (word lines) WL0-WL111. The dielectric layers are labelled as DL0-DL116. Further, regions of the stack 510 which comprise NAND strings NS1 and NS2 are illustrated. Each NAND string encompasses a memory hole 518, 519 which is filled with materials which form memory cells adjacent to the word lines. A region 522 of the stack 510 is shown in greater detail in FIG. 5D and is discussed in further detail below.

The stack 510 includes a substrate 511, an insulating film 512 on the substrate 511, and a portion of a source line SL. NS1 has a source-end 513 at a bottom 514 of the stack and a drain-end 515 at a top 516 of the stack 510. Contact line connectors (e.g., slits, such as metal-filled slits) 517, 520 may be provided periodically across the stack 510 as interconnects which extend through the stack 510, such as to connect the source line to a particular contact line above the stack 510. The contact line connectors 517, 520 may be used during the formation of the word lines and subsequently filled with metal. A portion of a bit line BL0 is also illustrated. A conductive via 521 connects the drain-end 515 to BL0.

FIG. 5C illustrates a plot of memory hole diameter in the stack of FIG. 5B. The vertical axis is aligned with the stack of FIG. 5B and illustrates a width (wMH), e.g., diameter, of the memory holes 518 and 519. The word line layers WL0-WL111 of FIG. 5A are repeated as an example and are at respective heights z0-z111 in the stack. In such a memory device, the memory holes which are etched through the stack have a very high aspect ratio. For example, a depth-to-diameter ratio of about 25-30 is common. The memory holes may have a circular cross-section. Due to the etching process, the memory hole width can vary along the length of the hole. Typically, the diameter becomes progressively smaller from the top to the bottom of the memory hole. That is, the memory holes are tapered, narrowing at the bottom of the stack. In some cases, a slight narrowing occurs at the top of the hole near the select gate so that the diameter becomes slightly wider before becoming progressively smaller from the top to the bottom of the memory hole.

FIG. 5D illustrates a close-up view of the region 522 of the stack 510 of FIG. 5B. Memory cells are formed at the different levels of the stack at the intersection of a word line layer and a memory hole. In this example, SGD transistors 580, 581 are provided above dummy memory cells 582, 583 and a data memory cell MC. A number of layers can be deposited along the sidewall (SW) of the memory hole 530 and/or within each word line layer, e.g., using atomic layer deposition. For example, each column (e.g., the pillar which is formed by the materials within a memory hole 530) can include a charge-trapping layer or film 563 such as SiN or other nitride, a tunneling layer 564, a polysilicon body or channel 565, and a dielectric core 566. A word line layer can include a blocking oxide/block high-k material 560, a metal barrier 561, and a conductive metal 562 such as Tungsten as a control gate. For example, control gates 590, 591, 592, 593, and 594 are provided. In this example, all of the layers except the metal are provided in the memory hole 530. In other approaches, some of the layers can be in the control gate layer. Additional pillars are similarly formed in the different memory holes. A pillar can form a columnar active area (AA) of a NAND string.

When a memory cell is programmed, electrons are stored in a portion of the charge-trapping layer which is associated with the memory cell. These electrons are drawn into the charge-trapping layer from the channel, and through the tunneling layer. The Vt of a memory cell is increased in proportion to the amount of stored charge. During an erase operation, the electrons return to the channel.

Each of the memory holes 530 can be filled with a plurality of annular layers comprising a blocking oxide layer, a charge trapping layer 563, a tunneling layer 564 and a channel layer. A core region of each of the memory holes 530 is filled with a body material, and the plurality of annular layers are between the core region and the word line in each of the memory holes 530.

The NAND string can be considered to have a floating body channel because the length of the channel is not formed on a substrate. Further, the NAND string is provided by a plurality of word line layers above one another in a stack, and separated from one another by dielectric layers.

FIG. 6A illustrates a top view of an example word line layer WL0 of the stack 510 of FIG. 5B. As mentioned, a three-dimensional memory device can comprise a stack of alternating conductive and dielectric layers. The conductive layers provide the control gates of the SG transistors and memory cells. The layers used for the SG transistors are SG layers and the layers used for the memory cells are word line layers. Further, memory holes are formed in the stack and filled with a charge-trapping material and a channel material. As a result, a vertical NAND string is formed. Source lines are connected to the NAND strings below the stack and bit lines are connected to the NAND strings above the stack.

A block BLK in a three-dimensional memory device can be divided into sub-blocks, where each sub-block comprises a NAND string group which has a common SGD control line. For example, see the SGD lines/control gates SGD0, SGD1, SGD2 and SGD3 in the sub-blocks SBa, SBb, SBc and SBd, respectively. Further, a word line layer in a block can be divided into regions. Each region is in a respective sub-block and can extend between contact line connectors (e.g., slits) which are formed periodically in the stack to process the word line layers during the fabrication process of the memory device. This processing can include replacing a sacrificial material of the word line layers with metal. Generally, the distance between contact line connectors should be relatively small to account for a limit in the distance that an etchant can travel laterally to remove the sacrificial material, and that the metal can travel to fill a void which is created by the removal of the sacrificial material. For example, the distance between contact line connectors may allow for a few rows of memory holes between adjacent contact line connectors. The layout of the memory holes and contact line connectors should also account for a limit in the number of bit lines which can extend across the region while each bit line is connected to a different memory cell. After processing the word line layers, the contact line connectors can optionally be filed with metal to provide an interconnect through the stack.

In this example, there are four rows of memory holes between adjacent contact line connectors. A row here is a group of memory holes which are aligned in the x-direction. Moreover, the rows of memory holes are in a staggered pattern to increase the density of the memory holes. The word line layer or word line is divided into regions WL0a, WL0b, WL0c and WL0d which are each connected by a contact line 613. The last region of a word line layer in a block can be connected to a first region of a word line layer in a next block, in one approach. The contact line 613, in turn, is connected to a voltage driver for the word line layer. The region WL0a has example memory holes 610, 611 along a contact line 612. The region WL0b has example memory holes 614, 615. The region WL0c has example memory holes 616, 617. The region WL0d has example memory holes 618, 619. The memory holes are also shown in FIG. 6B. Each memory hole can be part of a respective NAND string. For example, the memory holes 610, 614, 616 and 618 can be part of NAND strings NS0_SBa, NS1_SBb, NS2_SBc, NS3_SBd, and NS4_SBe, respectively.

Each circle represents the cross-section of a memory hole at a word line layer or SG layer. Example circles shown with dashed lines represent memory cells which are provided by the materials in the memory hole and by the adjacent word line layer. For example, memory cells 620, 621 are in WL0a, memory cells 624, 625 are in WL0b, memory cells 626, 627 are in WL0c, and memory cells 628, 629 are in WL0d. These memory cells are at a common height in the stack.

Contact line connectors (e.g., slits, such as metal-filled slits) 601, 602, 603, 604 may be located between and adjacent to the edges of the regions WL0a-WL0d. The contact line connectors 601, 602, 603, 604 provide a conductive path from the bottom of the stack to the top of the stack. For example, a source line at the bottom of the stack may be connected to a conductive line above the stack, where the conductive line is connected to a voltage driver in a peripheral region of the memory device.

FIG. 6B illustrates a top view of an example top dielectric layer DL116 of the stack of FIG. 5B. The dielectric layer is divided into regions DL116*a*, DL116*b*, DL116*c* and DL116*d*. Each region can be connected to a respective voltage driver. This allows a set of memory cells in one region of a word line layer being programmed concurrently, with each memory cell being in a respective NAND string which is connected to a respective bit line. A voltage can be set on each bit line to allow or inhibit programming during each program voltage.

The region DL116*a* has the example memory holes 610, 611 along a contact line 612, which is coincident with a bit line BL0. A number of bit lines extend above the memory holes and are connected to the memory holes as indicated by the "X" symbols. BL0 is connected to a set of memory holes which includes the memory holes 611, 615, 617, 619. Another example bit line BL1 is connected to a set of memory holes which includes the memory holes 610, 614, 616, 618. The contact line connectors (e.g., slits, such as metal-filled slits) 601, 602, 603, 604 from FIG. 6A are also illustrated, as they extend vertically through the stack. The bit lines can be numbered in a sequence BL0-BL23 across the DL116 layer in the x-direction.

Different subsets of bit lines are connected to memory cells in different rows. For example, BL0, BL4, BL8, BL12, BL16, BL20 are connected to memory cells in a first row of cells at the right-hand edge of each region. BL2, BL6, BL10, BL14, BL18, BL22 are connected to memory cells in an adjacent row of cells, adjacent to the first row at the right-hand edge. BL3, BL7, BL11, BL15, BL19, BL23 are connected to memory cells in a first row of cells at the left-hand edge of each region. BL1, BL5, BL9, BL13, BL17, BL21 are connected to memory cells in an adjacent row of memory cells, adjacent to the first row at the left-hand edge.

The memory cells of the memory blocks can be programmed to retain one or more bits of data in multiple data states, each of which is associated with a respective threshold voltage Vt range. For example, FIG. 7 depicts a threshold voltage Vt distribution of a group of memory cells programmed according to a one bit per memory cell (SLC) storage scheme. In the SLC storage scheme, there are two total data states, including the erased state (Er) and a single programmed data state (S1). FIG. 8 illustrates the threshold voltage Vt distribution of a three bits per cell (TLC) storage scheme that includes eight total data states, namely the erased state (Er) and seven programmed data states (S1, S2, S3, S4, S5, S6, and S7). Each programmed data state (S1-S7) is associated with a respective verify voltage (Vv1-Vv7), which is employed during a verify portion of a programming operation. FIG. 9 depicts a threshold voltage Vt distribution of a four bits per cell (QLC) storage scheme that includes sixteen total data states, namely the erased state (Er) and fifteen programmed data states (S1-S15). Other storage schemes are also available, such as two bits per cell (MLC) with four data states or five bits per cell (PLC) with thirty-two data states. Generally, programming a fixed amount of data into memory cells at a higher number of bits per memory cell (such as TLC or QLC) requires more time than programming the same amount of data into more memory cells at a reduced number of bits per cell. In other words, there is a tradeoff between programming high speed (performance) and programming at high density. Also, programming to TLC or QLC stresses the memory cells more than programming to SLC, and therefore, the endurance (as measured in terabytes written [TBW]) of a memory device programming to SLC is generally greater than the endurance of a memory device programming to TLC or QLC.

SUMMARY

One aspect of the present disclosure is related to a method of erasing a plurality of memory cells in a memory device. The method includes the step of preparing a memory device that includes a plurality of memory blocks. The memory blocks include respective first and second sub-blocks that can be programmed and erased independently of one another. The first and second sub-blocks include an array of memory cells arranged in a plurality of word lines. The method proceeds with the step of erasing the memory cells of a selected memory block of the plurality of memory blocks in at least one erase loop. The at least one erase loop includes simultaneously applying an erase voltage to a plurality of channels in the selected memory block, applying a first bias voltage to the plurality of word lines of the first sub-block, and applying a second bias voltage to the plurality of word lines of the second sub-block. The first bias voltage is different than the second bias voltage so that the memory cells of the first and second sub-blocks are erased at different speeds.

According to another aspect of the present disclosure, the first sub-block is a lower sub-block on a source side of the memory block and the second sub-block is an upper sub-block on a drain side of the memory block.

According to yet another aspect of the present disclosure, the lower sub-block includes a plurality of lower memory holes and the upper sub-block includes a plurality of upper memory holes.

According to still another aspect of the present disclosure, the at least one erase loop includes a plurality of erase loops. Between erase loops the first bias voltage that is applied to the word lines of the lower sub-block is adjusted by a first voltage step size and the second bias voltage that is applied to the word lines of the upper sub-block is adjusted by a second voltage step size. The first and second voltage step sizes are different.

According to a further aspect of the present disclosure, the first voltage step size is greater than the second voltage step size.

According to yet a further aspect of the present disclosure, the at least one erase loop further includes the steps of performing an erase-verify operation on only the memory cells of the upper sub-block and performing an erase-verify operation on only the memory cells of the lower sub-block.

According to still a further aspect of the present disclosure, in response to the memory cells of the lower sub-block passing the erase-verify operation, the method further includes the steps of, in at least one additional erase loop, simultaneously applying an erase voltage to a plurality of channels in the selected sub-block, applying an erase-inhibit voltage to the plurality of word lines of the lower sub-block, and applying the second bias voltage to the plurality of word lines of the upper sub-block.

According to another aspect of the present disclosure, the at least one additional erase loop further including the steps of performing the erase-verify operation on only the memory cells of the upper sub-block and skipping the erase-verify operation for the memory cells of the lower sub-block.

Another aspect of the present disclosure is related to a memory device that includes a plurality of memory blocks. The memory blocks include respective first and second sub-blocks that can be programmed and erased independently of one another. The first and second sub-blocks include an array of memory cells arranged in a plurality of word lines. The memory device also includes control circuitry that is configured to erase the memory cells of a selected memory block of the plurality of memory blocks in at least one erase loop. In the at least one erase loop, the control circuitry is configured to simultaneously apply an erase voltage to a plurality of channels in the selected memory block, apply a first bias voltage to the plurality of word lines of the first sub-block, and apply a second bias voltage to the plurality of word lines of the second sub-block. The first bias voltage is different than the second bias voltage so that the memory cells of the first and second sub-blocks are erased at different speeds.

According to another aspect of the present disclosure, the first sub-block is a lower sub-block on a source side of the memory block and the second sub-block is an upper sub-block on a drain side of the memory block.

According to yet another aspect of the present disclosure, the lower sub-block includes a plurality of lower memory holes and the upper sub-block includes a plurality of upper memory holes.

According to still another aspect of the present disclosure, the at least one erase loop includes a plurality of erase loops. Between erase loops, the control circuitry is configured to adjust the first bias voltage that is applied to the word lines of the lower sub-block by a first voltage step size and adjust the second bias voltage that is applied to the word lines of the upper sub-block by a second voltage step size. The first and second voltage step sizes are different.

According to a further aspect of the present disclosure, the first voltage step size is greater than the second voltage step size.

According to yet a further aspect of the present disclosure, during the at least one erase loop the control circuitry is further configured to perform an erase-verify operation on only the memory cells of the upper sub-block and perform an erase-verify operation on only the memory cells of the lower sub-block.

According to still a further aspect of the present disclosure, in response to the memory cells of the lower sub-block passing the erase-verify operation, in at least one additional erase loop, the control circuitry is further configured to simultaneously apply an erase voltage to a plurality of channels in the selected sub-block, apply an erase-inhibit voltage to the plurality of word lines of the lower sub-block, and apply the second bias voltage to the plurality of word lines of the upper sub-block.

According to another aspect of the present disclosure, during the at least one additional erase loop, the control circuitry is further configured to perform the erase-verify operation on only the memory cells of the upper sub-block and skip the erase-verify operation for the memory cells of the lower sub-block.

Yet another aspect of the present disclosure is related to an apparatus that includes a plurality of memory blocks. The memory blocks include respective first and second sub-blocks that can be programmed and erased independently of one another. The first and second sub-blocks include an array of memory cells arranged in a plurality of word lines. The memory blocks each including a plurality of upper memory holes and a plurality of lower memory holes. The apparatus further includes an erasing means for erasing the memory cells of a selected memory block of the plurality of memory blocks in at least one erase loop. In the at least one erase loop, the erasing means is configured to simultaneously apply an erase voltage to a plurality of channels in the selected memory block, apply a first bias voltage to the plurality of word lines that are aligned with the plurality of lower memory holes, and apply a second bias voltage to the plurality of word lines that are aligned with the upper memory holes. The first bias voltage is different than the second bias voltage so that the memory cells of the plurality of word lines that are aligned with the upper memory holes are erased at a different speed than the memory cells of the word lines that are aligned with the lower memory holes.

According to another aspect of the present disclosure, the at least one erase loop includes a plurality of erase loops. Between erase loops, the erasing means is configured to adjust the first bias voltage that is applied to the word lines that are aligned with the lower memory holes by a first voltage step size and adjust the second bias voltage that is applied to the word lines that are aligned with the upper memory holes by a second voltage step size. The first and second voltage step sizes are different.

According to yet another aspect of the present disclosure, the first voltage step size is greater than the second voltage step size.

According to still another aspect of the present disclosure, the control circuitry is further configured to perform an erase-verify operation on only the memory cells of the word lines that are aligned with the upper memory holes and perform an erase-verify operation on only the memory cells of the word lines that are aligned with the lower memory holes.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope. The disclosure is described and explained with added specificity and detail through the use of the accompanying drawings in which:

FIG. 1 depicts blocks of memory cells in an example two-dimensional configuration of a memory array:

FIG. 2A and FIG. 2B depict cross-sectional views of example floating gate memory cells in NAND strings:

FIG. 3A and FIG. 3B depict cross-sectional views of example charge-trapping memory cells in NAND strings:

FIG. 4 depicts an example block diagram of a sense block SB1:

FIG. 5A is a perspective view of a set of blocks in an example three-dimensional configuration of a memory array:

FIG. 5B depicts an example cross-sectional view of a portion of one of the blocks of FIG. 5A:

FIG. 5C depicts a plot of memory hole diameter of the stack of FIG. 5B:

FIG. 5D depicts a close-up view of region 522 of the stack of FIG. 5B;

FIG. 6A depicts a top view of an example word line layer WL0 of the stack of FIG. 5B:

FIG. 6B depicts a top view of an example top dielectric layer DL116 of the stack of FIG. 5B:

FIG. 7 depicts a threshold voltage distribution of a page of memory cells programmed to one bit per memory cell (SLC):

FIG. 8 depicts a threshold voltage distribution of a page of memory cells programmed to three bits per memory cell (TLC):

FIG. 9 depicts a threshold voltage distribution of a page of memory cells programmed to four bits per memory cell (QLC):

FIG. 11 is a table of voltages applied to various components of the memory block during an example erase pulse and an erase-verify operation;

FIG. 18 is a flow chart of the steps of a process of erasing the memory cells of a memory block according to an example embodiment of the present disclosure.

DESCRIPTION OF THE ENABLING EMBODIMENTS

Figure 10A:
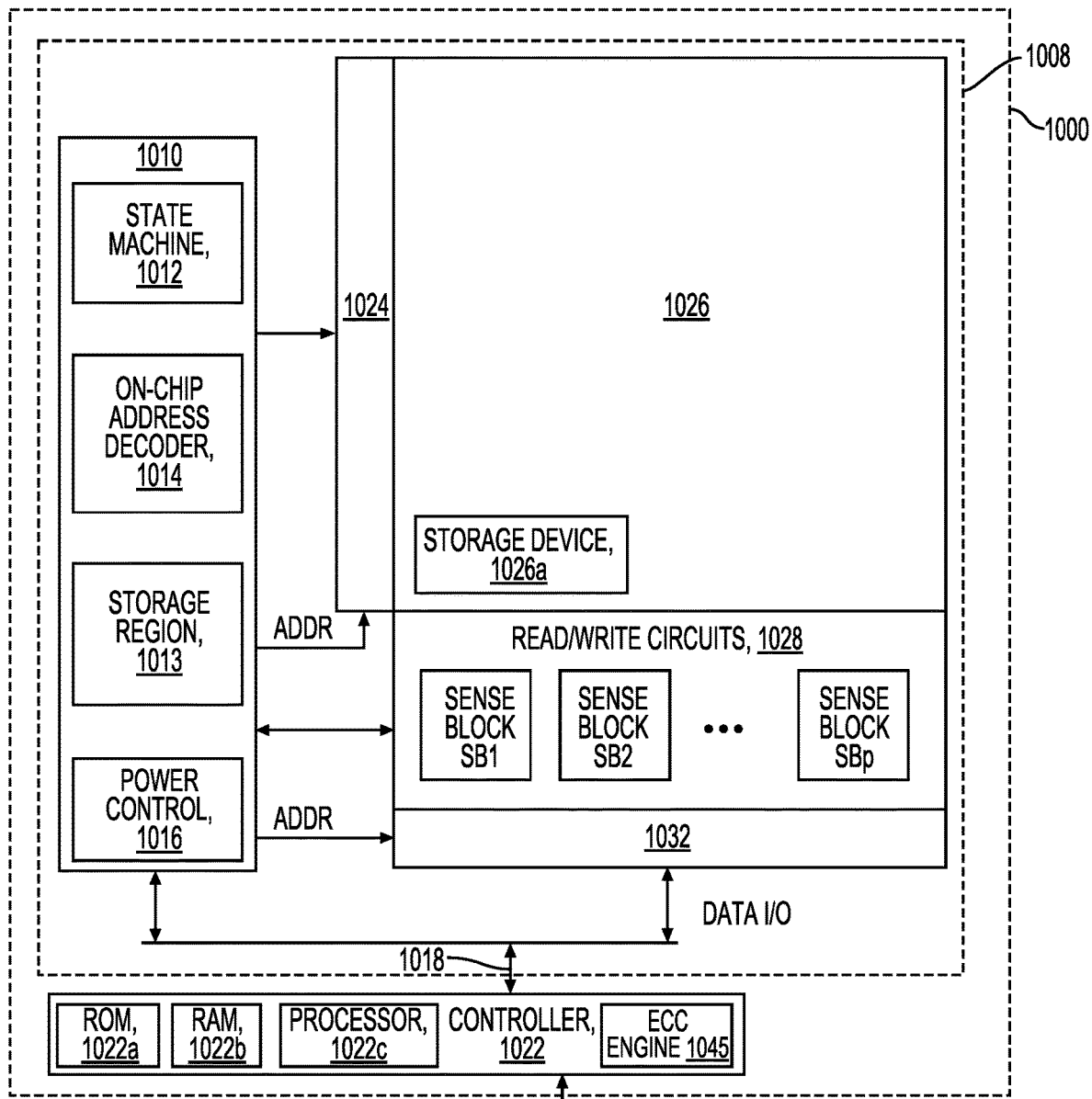
FIG. 10A is a block diagram of an example memory device.

FIG. 10A is a block diagram of an example memory device 1000 that is configured to operate according to the erasing techniques of the present disclosure. The memory die 1008 includes a memory structure 1026 of memory cells arranged in word lines, such as an array of memory cells, control circuitry 1010, and read/write circuits 1028. The memory structure 1026 is addressable by word lines via a row decoder 1024 and by bit lines via a column decoder 1032. The read/write circuits 1028 include multiple sense blocks SB1, SB2, . . . SBp (sensing circuitry) and allow a page of memory cells to be read or programmed in parallel. Typically, a controller 1022 is included in the same memory device 1000 (e.g., a removable storage card) as the one or more memory die 1008. Commands and data are transferred between the host 1040 and controller 1022 via a data bus 1020, and between the controller and the one or more memory die 1008 via lines 1018.

The memory structure 1026 can be two-dimensional or three-dimensional. The memory structure 1026 may comprise one or more array of memory cells including a three-dimensional array. The memory structure 1026 may comprise a monolithic three-dimensional memory structure in which multiple memory levels are formed above (and not in) a single substrate, such as a wafer, with no intervening substrates. The memory structure 1026 may comprise any type of non-volatile memory that is monolithically formed in one or more physical levels of arrays of memory cells having an active area disposed above a silicon substrate. The memory structure 1026 may be in a non-volatile memory device having circuitry associated with the operation of the memory cells, whether the associated circuitry is above or within the substrate.

The control circuitry 1010 cooperates with the read/write circuits 1028 to perform memory operations on the memory structure 1026, and includes a state machine 1012, an on-chip address decoder 1014, and a power control module 1016. The state machine 1012 provides chip-level control of memory operations. As discussed in further detail below and illustrated in FIG. 10C, the control circuitry 1010 is configured to operate the memory device 1000 according to erase techniques that allow for certain word lines to be erased at different speeds. This reduces the difference in data retention degradation that the word lines of a memory block experience during the operating life of the memory device and allow for improved uniformity of the threshold voltage Vt margin across the memory block. These techniques include the step 1060 of, during the application of an erase pulse, applying a first erase bias voltage to the word lines that are aligned with a plurality of lower memory holes. At step 1062, a second erase bias voltage is applied to the word lines aligned with a plurality of upper memory holes. At step 1064, the word lines aligned with the upper memory holes are verified separately from the word lines with the lower memory holes. At step 1066, the word lines aligned with the lower memory holes are verified separately from the word lines of the upper memory holes. These steps and others are discussed in greater detail below, particularly in reference to the flow chart of FIG. 18.

Turning back to FIG. 10A, a storage region 1013 may, for example, be provided for programming parameters. The programming parameters may include a program voltage, a program voltage bias, position parameters indicating positions of memory cells, contact line connector thickness parameters, a verify voltage, and/or the like. The position parameters may indicate a position of a memory cell within the entire array of NAND strings, a position of a memory cell as being within a particular NAND string group, a position of a memory cell on a particular plane, and/or the like. The contact line connector thickness parameters may indicate a thickness of a contact line connector, a substrate or material that the contact line connector is comprised of, and/or the like.

The on-chip address decoder 1014 provides an address interface that is used by the host or a memory controller to determine the hardware address used by the decoders 1024 and 1032. The power control module 1016 controls the power and voltages supplied to the word lines and bit lines during memory operations. It can include drivers for word lines, SGS and SGD transistors, and source lines. The sense blocks can include bit line drivers, in one approach. An SGS transistor is a select gate transistor at a source end of a NAND string, and an SGD transistor is a select gate transistor at a drain end of a NAND string.

In some embodiments, some of the components can be combined. In various designs, one or more of the components (alone or in combination), other than memory structure 1026, can be thought of as at least one control circuit which is configured to perform the actions described herein. For example, a control circuit may include any one of, or a combination of, control circuitry 1010, state machine 1012, decoders 1014/1032, power control module 1016, sense blocks SBb, SB2, SBp, read/write circuits 1028, controller 1022, and so forth.

Figure 10B:
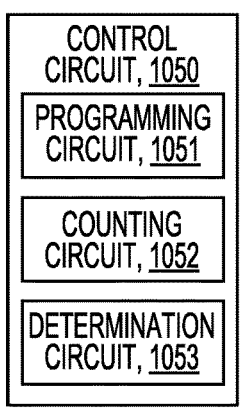
FIG. 10B is a block diagram of an example control circuit.
Figure 10C:
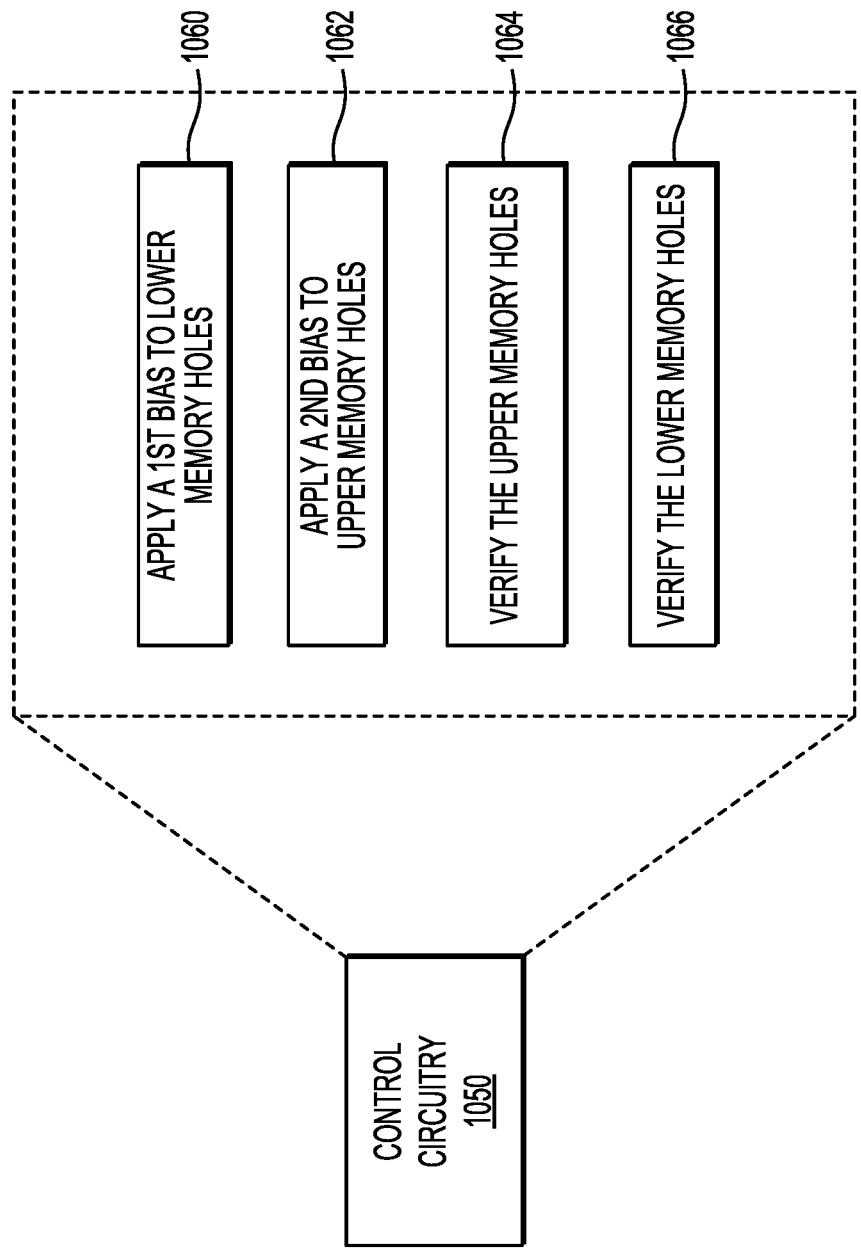
FIG. 10C is another block diagram of an example control circuit.

The control circuits can include a programming circuit configured to perform a program and verify operation for one set of memory cells, wherein the one set of memory cells comprises memory cells assigned to represent one data state among a plurality of data states and memory cells assigned to represent another data state among the plurality of data states; the program and verify operation comprising a plurality of program and verify iterations; and in each program and verify iteration, the programming circuit performs programming for the one selected word line after which the programming circuit applies a verification signal to the selected word line. The control circuits can also include a counting circuit configured to obtain a count of memory cells which pass a verify test for the one data state. The control circuits can also include a determination circuit configured to determine, based on an amount by which the count exceeds a threshold, if a programming operation is completed. For example, FIG. 10B is a block diagram of an example control circuit 1050 which comprises a programming circuit 1051, a counting circuit 1052, and a determination circuit 1053.

The off-chip controller 1022 may comprise a processor 1022c, storage devices (memory) such as ROM 1022a and RAM 1022b and an error-correction code (ECC) engine 1045. The ECC engine can correct a number of read errors which are caused when the upper tail of a Vth distribution becomes too high. However, uncorrectable errors may exist in some cases. The techniques provided herein reduce the likelihood of uncorrectable errors.

The storage device(s) 1022a, 1022b comprise, code such as a set of instructions, and the processor 1022c is operable to execute the set of instructions to provide the functionality described herein. Alternately or additionally, the processor 1022c can access code from a storage device 1026a of the memory structure 1026, such as a reserved area of memory cells in one or more word lines. For example, code can be used by the controller 1022 to access the memory structure 1026 such as for programming, read and erase operations. The code can include boot code and control code (e.g., set of instructions). The boot code is software that initializes the controller 1022 during a booting or startup process and enables the controller 1022 to access the memory structure 1026. The code can be used by the controller 1022 to control one or more memory structures 1026. Upon being powered up, the processor 1022c fetches the boot code from the ROM 1022a or storage device 1026a for execution, and the boot code initializes the system components and loads the control code into the RAM 1022b. Once the control code is loaded into the RAM 1022b, it is executed by the processor 1022c. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below and provide the voltage waveforms including those discussed further below.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple memory strings in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z-direction is substantially perpendicular and the x- and y-directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional array of NAND strings, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

The memory cells of a memory block are typically programmed by applying a voltage differential between a word line of a memory cell and a bit line coupled to the same memory cell, thereby causing electrons to tunnel into the floating gate of that memory cell and causing a threshold voltage of the memory cell to increase. Programming typically occurs sequentially from one word line to another across a memory block or sub-block. In other words, programming occurs with one word line at a time.

An erase operation, on the other hand, involves transitioning the memory cells from their respective programmed data states to the erased state by transferring electrons from the floating gates of the memory cells into the well region and substrate of the chip. During the erase operation, it is desired to lower the threshold voltages Vth of the memory cells below an erase-verify level that represents an upper bound of the erased data state. An erase operation can include a number of erase loops, each including an erase operation followed by a verify operation. The erase operation is typically performed on a memory block level (one entire memory block at a time) or on a sub-block level (one sub-block at a time) rather than a word line level, as is the case with programming.

In an erase loop, the control circuitry is configured to apply an erase voltage VERA to the strings of the memory block while applying a very low voltage (for example, zero Volts) to the word lines of the memory block to provide a positive channel-to-gate voltage for the memory cells of the block to drive electrons out of the charge storing materials of the memory cells, thereby reducing the threshold voltages Vth of the memory cells. The erase voltage VERA or Verase can be applied to the strings either from the bit lines on the drain side of the memory block or from the source lines on the source side of the memory block or from both sides.

FIG. 11 is a table 1100 including exemplary bias conditions during an erase operation in column 1102. Due to capacitive coupling, during the erase operation, the bit lines, are raised to a high positive potential (for example, 20 V). A strong electric field is thus applied to the tunnel oxide layers of the memory cells of the selected memory block and the electrons of the floating gate are emitted to the substrate, thereby lowering the threshold voltages of those memory cells.

In the verify portion of an erase loop (Column 1104 of Table 1100), an erase verify voltage (0 V in the exemplary embodiment) is applied to the control gates of the memory cells of the memory block and sensing circuitry is used to sense currents in the NAND strings to determine if the memory cells have been sufficiently erased. If an insufficient number of memory cells have been sufficiently erased, then the erase operation proceeds with an additional erase loop to further reduce the threshold voltages Vt of the memory cells being erased. This process is repeated in one or more subsequent erase loops until the erase verify operation passes. Similar to ISPP programming, as described above, the magnitude of the voltage of the erase pulse VERA can increase between erase loops.

One important measurement for a NAND memory device is the threshold voltage Vt margin, which is a measurement of the voltage gap between the distributions of data states, such as those illustrated in FIGS. 7-9. An increase in the Vt margin is associated with improved reliability because a greater Vt margin makes it easier for the memory device to identify which data state a memory cell is in during a later read operation. One problem that memory devices sometimes face is commonly known as data retention (DR) degradation in the memory holes, which can result in a loss of Vt margin, thereby leading to an increased failed bit count (FBC).

Figure 12:
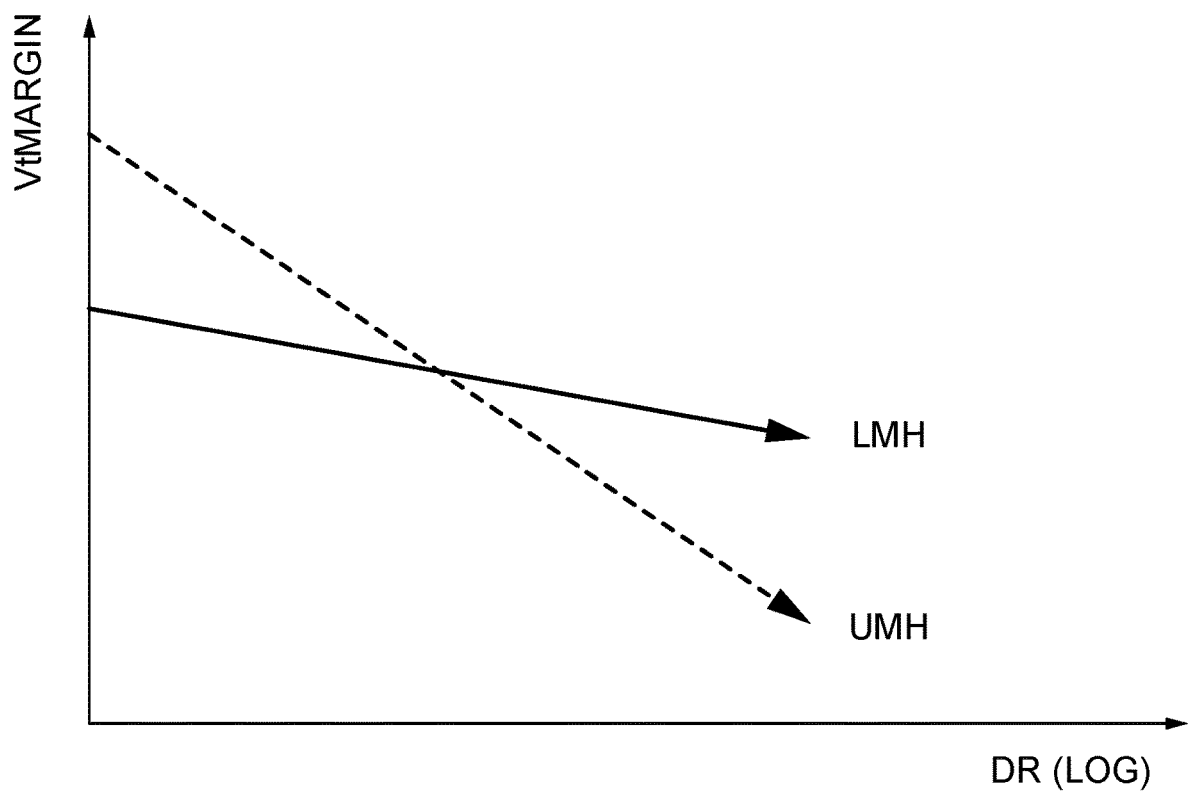
FIG. 12 is a plot of threshold voltage Vt margin vs. program-erase cycles for both a lower memory hole and an upper memory hole in an example memory block during the operating life of the memory block.

In some memory devices, the memory holes are divided into two portions that are formed independently of one another and are joined together during a fabrication process. These two portions are an upper memory hole, which is located on a drain side of the memory block, and a lower memory hole, which is located on a source side of the memory block. These different portions may behave differently and, in some cases, the memory cells of the upper memory holes experience greater DR degradation than the memory cells of the lower memory holes. Further, the DR degradation experienced by the upper memory holes gets worse with increased programming and erasing cycling at an increased rate as compared to the lower memory holes, thereby leading to inconsistency between the Vt margin of the memory cells of the upper memory holes and the memory cells of the lower memory holes. This trend is illustrated in the plot of FIG. 12. Some factors that may cause the difference in DR degradation between the upper and lower memory holes include differences in ON pitch, memory hole shape, MANOS (metal-oxide-nitride-oxide-semiconductor) thickness, and silicon concentration in a charge trapping layer of each memory cell.

The present disclosure is related to a gentle erase technique for at least the memory cells of the upper memory hole in order to reduce the DR degradation experienced by the upper memory hole to a level that is commensurate with the amount of DR degradation experienced by the lower memory hole. While the memory cells of the upper memory holes are erased using the gentle erase technique, the memory cells of the lower memory holes are erased using a "normal" erase technique. This leads to a more consistent Vt margin between the memory cells of the upper and lower memory holes during the entire operating life of the memory device.

As discussed in further detail below, as compared to the normal erase technique, the gentle erase technique includes one or more of: (1) applying a reduced initial erase voltage VERA_int, (2) a reduced voltage step size dVERA between erase loops, (3) a reduced final erase voltage VERA_final, and (4) an increased number of erase pulses when erasing the upper memory hole. By erasing the memory cells of the upper memory hole using the gentle erase techniques, the amount of tunneling damage caused to these memory cells is reduced during the erasing operation, thereby reducing program-erase cycling degradation and improving the Vt margin of the memory cells of the upper memory holes when programmed over the life of the memory device to a level that is similar to the Vt margin of the memory cells of the lower memory holes.

Figure 13B:
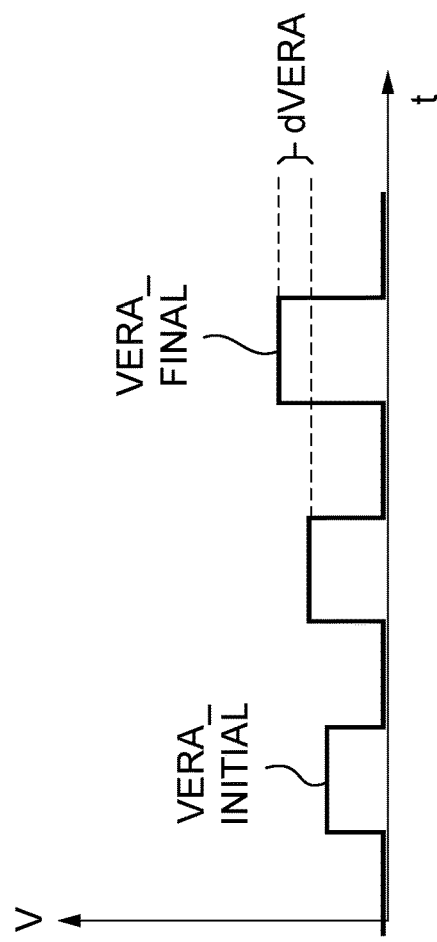
FIG. 13B is a plot of erase voltage vs. time during a "gentle" erase operation.
Figure 13A:
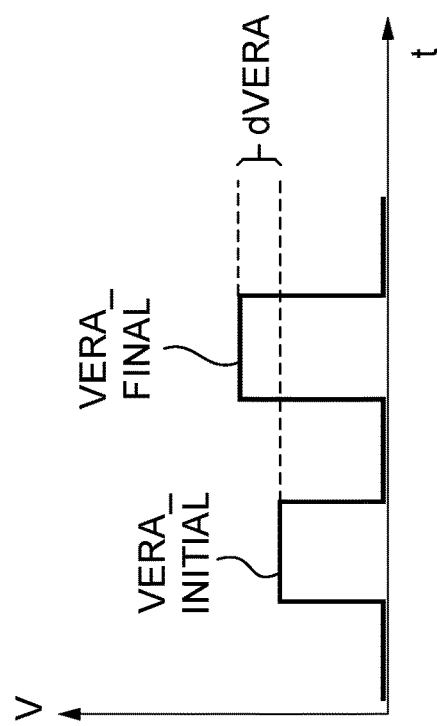
FIG. 13A is a plot of erase voltage vs. time during a "normal" erase operation.

FIG. 13A depicts the voltage waveform that the memory cells of the lower memory hole experience when they receive the normal erase procedure, and FIG. 13B depicts the that the memory cells of the upper memory hole experience when they receive the gentle erase procedure. As illustrated, VERA_initial, VERA_final, and dVERA are lower in the gentle erase waveform of FIG. 13B than in the waveform of FIG. 13A.

Figure 14:
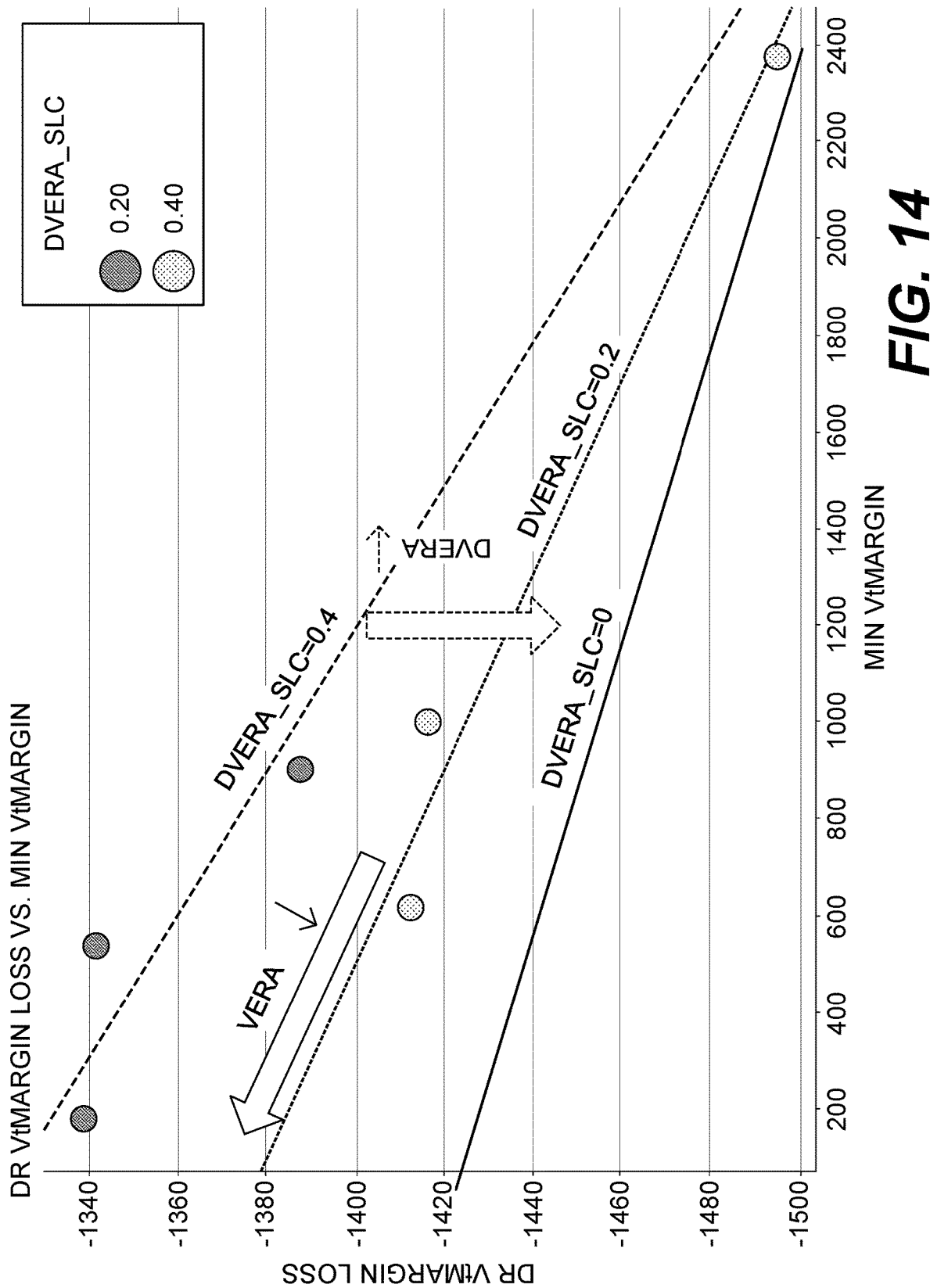
FIG. 14 is a plot of data retention Vt margin loss vs. minimum Vt margin with at different erase voltages VERA and different erase voltage step sizes dVERA.

Turning now to FIG. 14, a plot is depicted of Vt margin loss due to DR degradation versus minimum Vt margin for different initial erase voltages VERA_initial and for different voltage step sizes dVERA in an example memory device. As illustrated, with a fixed dVERA, voltage reducing VERA_initial reduces the Vt margin loss caused by DR degradation, but this comes with a program disturb/read disturb Vt margin loss penalty. As also illustrated, reducing dVERA reduces the Vt margin loss due to DR degradation with minimal impact from program disturb/read disturb Vt margin.

Figure 15:
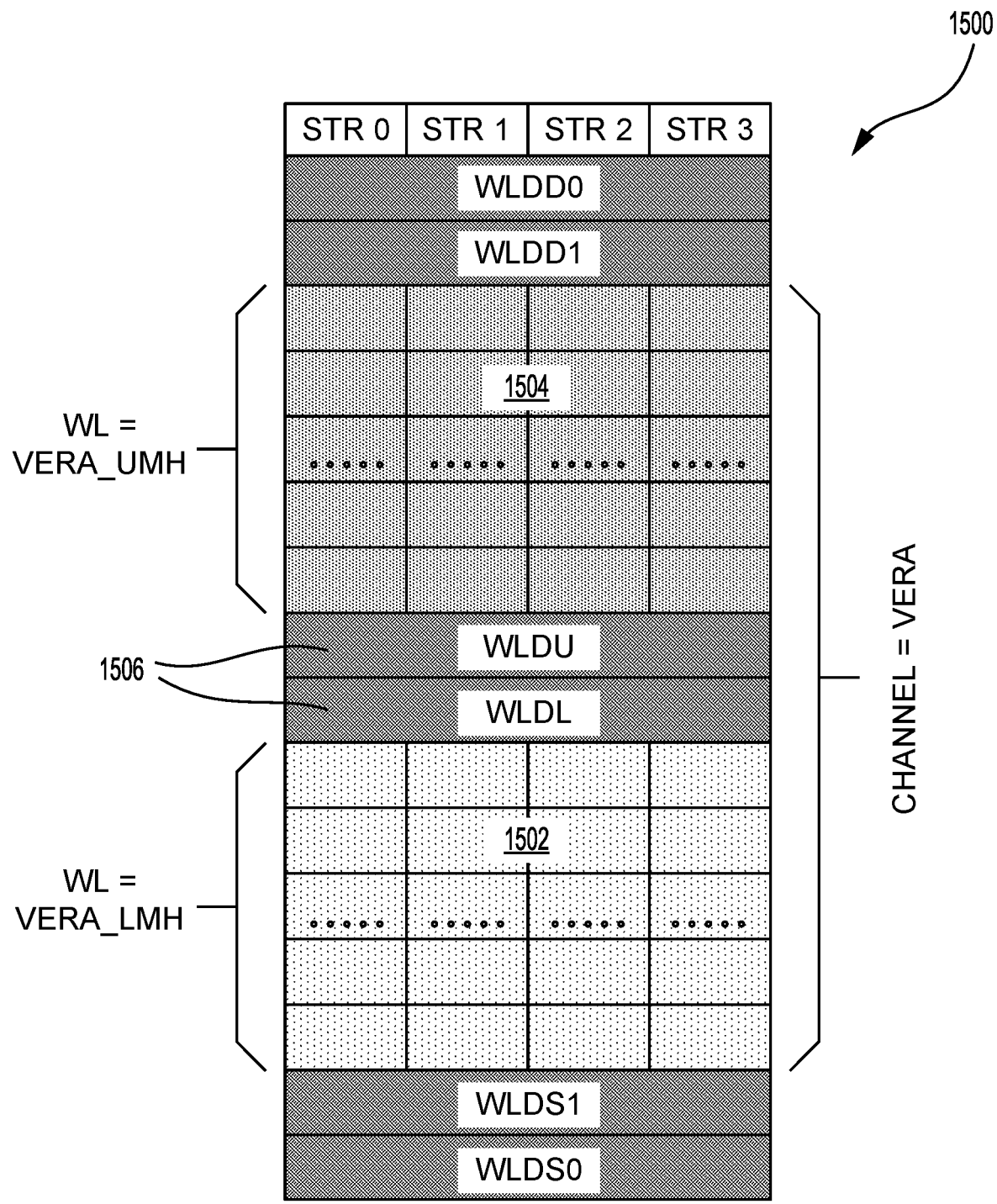
FIG. 15 is a schematic view of an example memory block with two sub-blocks that are simultaneously being erased during an erase pulse.

With reference to FIG. 15, in the example embodiments discussed below, the word lines of the memory block 1500 have been divided into a lower sub-block 1502 that contains the lower memory holes and an upper sub-block 1504 that contains the upper memory holes. The upper and lower sub-blocks 1502, 1504 can be programmed and erased either independently of one another or simultaneously. The lower and upper sub-blocks 1502, 1504 are separated from one another by a plurality of dummy word lines 1506 that do not contain data. The upper sub-block 1504 is located on a source side of the memory bock 1500, and the lower sub-block 1502 is located on a drain side of the memory block 1500.

According to one example embodiment, both of the lower and upper sub-blocks 1502, 1504 are erased together (simultaneously) in one erase operation but at different erasing speeds such that the memory cells of the lower sub-block 1502 receive the faster, normal erase and the memory cells of the upper sub-block 1504 receive the slower, gentle erase. As discussed in further detail below, after the application of the erase pulse, the lower and upper sub-blocks 1502, 1504 are verified sequentially, i.e., independently of one another.

To effectuate the different erase speeds for the lower and upper sub-blocks 1502, 1504, during the erase pulse of at least one erase-verify loop, an erase voltage VERA is applied to channels of the memory block from either the source side or the drain side or both, and two different VERA biases are simultaneously applied to the word lines of the lower and upper sub-blocks 1502, 1504 such that the effective erase voltages applied to the lower and upper sub-blocks 1502, 1504 are different. More specifically, a first bias VERA_LMH is applied to the word lines of the lower sub-block 1502, and a second bias VERA_UMH is applied to the word lines of the upper sub-block 1504. The first and second bias voltages VERA_LMH, VERA_UMH are selected such that the memory cells of the upper sub-block 1504 receive a reduced starting erase voltage VERA_initial and a reduced voltage step size dVERA as compared to the memory cells of the lower sub-block 1502.

In an example embodiment, during an erase loop "n," the first and second biases VERA_LMH, VERA_UMH may be sequentially increased according to the following equations:

$$VERA\_LMH = VERA\_LMH + DVERA\_LMH * (n-1) \quad \text{Eq. (1)}$$
$$VERA\_UMH = VERA\_UMH + DVERA\_UMH * (n-1) \quad \text{Eq. (2)}$$

The initial VERA_LMH (VERA_LMH_initial) that is applied to the word lines of the lower sub-block 1502 during the erase pulse of a first erase loop is greater than the initial VERA_UMH (VERA_UMH_initial) that is applied to the word lines of the upper sub-block 1504 during the same first erase loop. For example, in an exemplary embodiment, VERA_UMH_initial is 1.2 V less than VERA_LMH_initial. Also, in the exemplary embodiment, DVERA_UMH is less than DVERA_LMH. For example, in an example embodiment, DVERA_UMH is 0.2 V and DVERA_LMH is 0.4 V.

Figure 16:
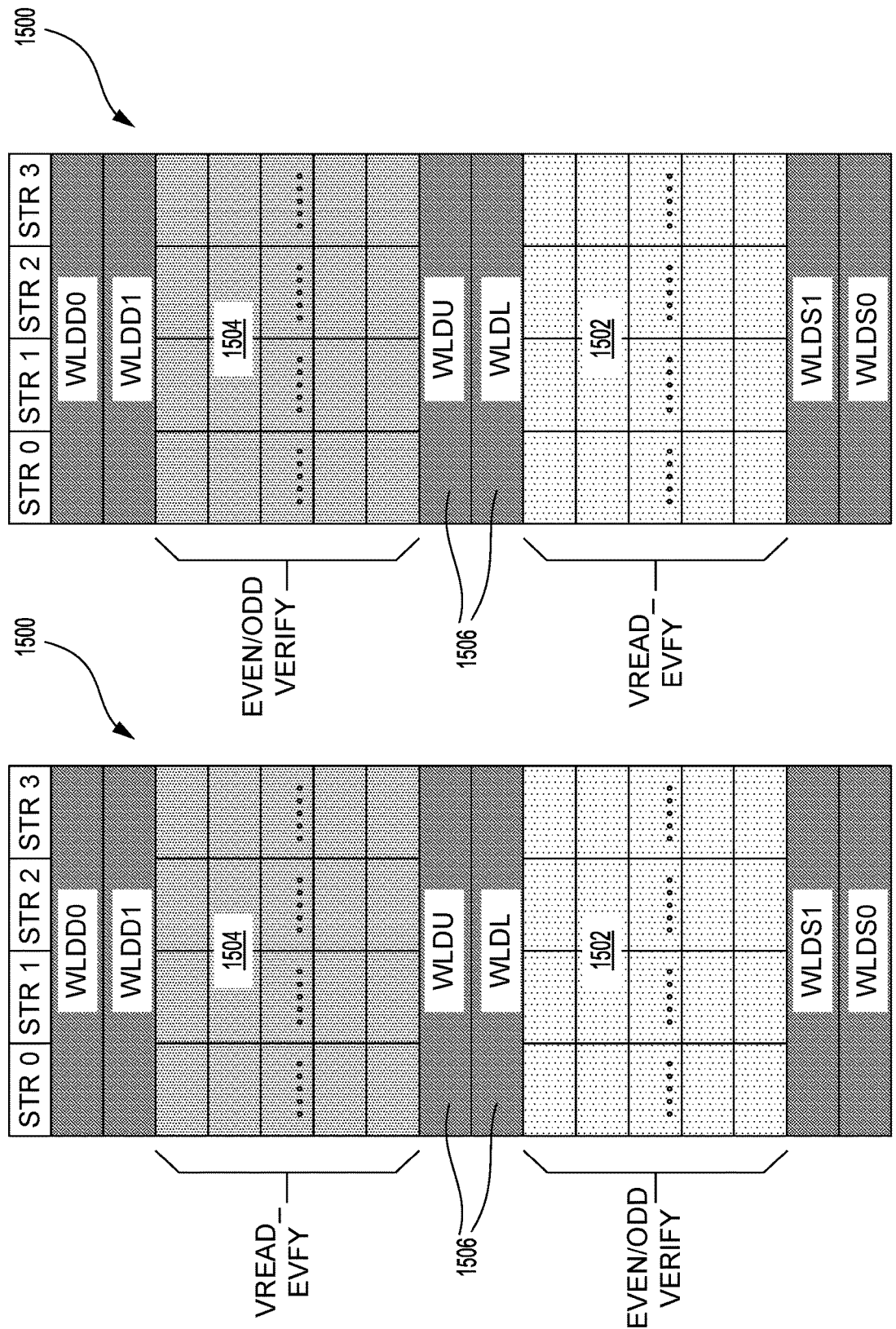
FIG. 16A is a schematic view of the example memory block while the memory cells of a lower sub-block are being verified.
FIG. 16B is a schematic view of the example memory block while the memory cells of the upper sub-block are being verified.

Following the erase pulse, the memory cells of the lower sub-block 1504 are verified separately (independently) from the memory cells of the upper memory sub-block 1502. With reference to FIGS. 16A and 16B, in the exemplary embodiment, the memory cells of the lower sub-block 1502 are verified first (FIG. 16A), and the memory cells of the upper sub-block 1504 are verified second (FIG. 16B). However, in some embodiments, the memory cells of the upper sub-block 1504 could be verified first and the memory cells of the lower sub-block 1502 could be verified second.

As illustrated in FIG. 16A, during the erase verify operation for the lower sub-block 1502, a VREAD_EVFY is applied to the word lines of the upper sub-block 1504 to turn on the memory cells of the upper sub-block 1504 while an erase-verify voltage (for example, 0 V) is applied to the word lines of the lower sub-block 1502. The reverse occurs during verify of the upper sub-block 1504. In other words, as illustrated in FIG. 16B, during the erase verify operation of the upper sub-block 1504, the erase-verify voltage is applied to the word lines of the upper sub-block 1504 and the VREAD_EVFY voltage is applied to the word lines of the lower sub-block 1502. In some embodiments, the erase-verify operation can be an even/odd operation whereby even numbered bit lines are verified separately from odd numbered bit lines. In other embodiments, all of the bit lines can be verified concurrently.

Figure 17:
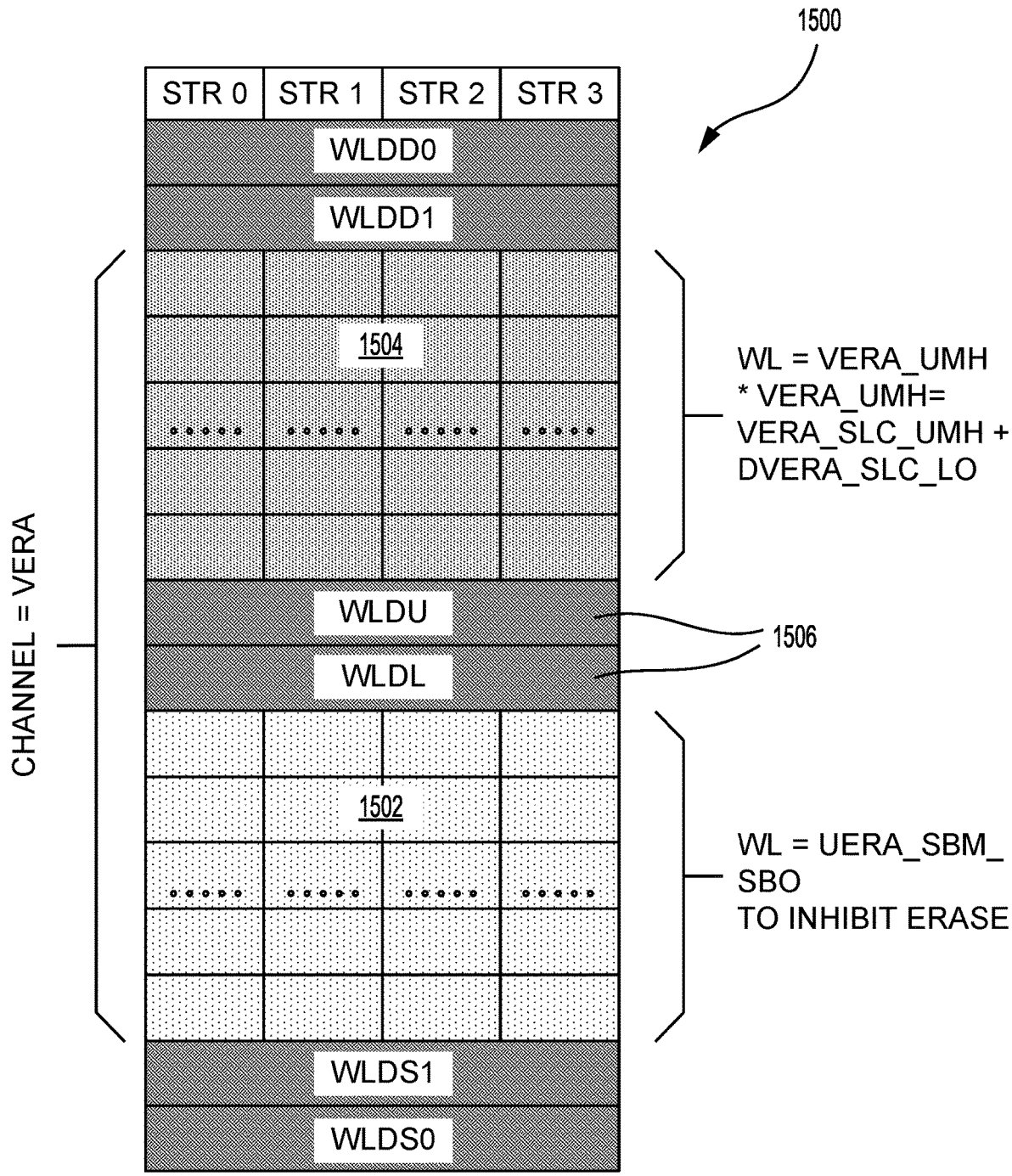
FIG. 17 is a schematic view of the example memory block where only the upper sub-block is being erased during an erase pulse.

Because the memory cells of the lower sub-block 1502 receive the faster, normal erase, they may pass erase-verify before the memory cells of the upper sub-block 1504 pass erase-verify. Thus, in many cases, it may take one or more additional erase loops for the memory cells of the upper sub-block 1504 to pass erase-verify. FIG. 17 schematically depicts the voltages applied to the lower and upper sub-blocks 1502, 1504 during this additional erase pulse. As illustrated, the second bias VERA_UMH is applied to the word lines of the upper sub-block 1504, and an inhibit voltage VERA_INHIBIT is applied to the word lines of the lower sub-block 1502 to inhibit erase of the memory cells of the lower sub-block 1502. In each of these additional erase loops where only the upper sub-block 1504 is erased, only the memory cells of the upper sub-block 1504 are verified (see FIG. 16B). In other words, verifying the memory cells of the lower sub-block 1502 can be skipped.

In some embodiments, a skip verify technique may be employed to skip erase verify in one or more erase loops for either or both of the lower and upper sub-blocks 1502, 1504, thereby improving erase performance.

Turning now to FIG. 18, another aspect of the present disclosure is related to a method 1800 of erasing the memory cells in a memory block. At step 1802, the control circuitry of the memory device receives an erase command. In the exemplary embodiment, the erase command is to erase both of the lower and upper sub-blocks 1502, 1504. However, in some embodiments, the erase command could be to only erase the lower sub-block 1502 or only erase the upper sub-block 1504.

At step 1804, the bias voltages are set to their initial values. Specifically, the lower sub-block 1502 bias voltage VERA_LMH is set to VERA_LMH_Initial, and the upper sub-block 1504 bias voltage VERA_UMH is set to VERA_UMH_Initial. In an example embodiment, VERA_LMH_Initial is 1.2 V greater than VERA_UMH_Initial.

At step 1806, the erase voltage VERA is applied to the channels to simultaneously erase the memory cells of both the lower and upper sub-blocks 1502, 1504. Also at this step, the bias voltage VERA_LMH is applied to all of the word lines of the lower sub-block 1502 and the bias voltage VERA_UMH is applied to all of the word lines of the upper sub-block 1504. The application of the different bias voltages VERA_LMH, VERA_UMH to the lower and upper sub-blocks 1502, 1504 respectively causes the memory cells of the lower sub-block 1502 to be erased more aggressively (at higher speeds) than the memory cells of the upper sub-block 1504.

At step 1808, the erase-verify operation is performed on the lower sub-block 1502. Specifically, erase-verify voltage (for example, zero Volts) is applied to the word lines of the lower sub-block 1502 while a pass voltage VREAD_EVFY is applied to the word lines of the upper sub-block 1504. A current is passed through the channels and is sensed to determine if the threshold voltages of the memory cells of the lower sub-block 1502 are below the erase-verify voltage.

At step 1810, the erase-verify operation is performed on the upper sub-block 1504. Specifically, erase-verify voltage (for example, zero Volts) is applied to the word lines of the upper sub-block 1504 while a pass voltage VREAD_EVFY is applied to the word lines of the lower sub-block 1502. A current is passed through the channels and is sensed to determine if the threshold voltages of the memory cells of the upper sub-block 1504 are below the erase-verify voltage.

At decision step 1812, it is determined if either of the lower and upper sub-blocks 1502, 1504 passed erase-verify during steps 1808 and 1810 respectively. If the answer at decision step 1812 is "no," then at step 1814, the bias voltages VERA_LMH, VERA_UMH are incrementally advanced by different step voltages. Specifically, bias voltage VERA_LMH of the lower memory hole 1502 is increased by DVERA_LMH (VERA_LMH=VERA_LMH+DVERA_LMH), and the bias voltage VERA_UMH of the upper memory hole 1504 is increased by DVERA_UMH (VERA_UMH=VERA_UMH+DVERA_UMH). In an example embodiment, DVERA_LMH is 0.2 V greater than DVERA_UMH. The process then returns to step 1806 to begin a new erase loop.

If, at decision step 1812, it is determined that the lower sub-block 1502 passed erase-verify, then at step 1816, one or more erase loops are performed only on the upper sub-block 1504. During the erase pulses of these additional erase loops, an inhibit voltage is applied to the word lines of the lower sub-block 1502 while the bias voltage VERA_UMH is applied to the word lines of the upper memory hole 1504. Also during these additional erase loops, the erase-verify operation is skipped for the lower sub-block 1502.

Although it is less likely to occur, if at step 1812, it is determined that the upper sub-block passed erase-verify, then at step 1818, one or more erase loops are performed only on the lower sub-block 1502. During the erase pulses of these additional erase loops, an inhibit voltage is applied to the word lines of the upper sub-block 1504 while the bias voltage VERA_LMH is applied to the word lines of the lower memory hole 1502. Also during these additional erase loops, the erase-verify operation is skipped for the upper sub-block 1504.

Following either step 1816 or 1818, at step 1820, the erase operation is completed.

Various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that includes customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it includes one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Additionally, the terms "couple," "coupled," or "couples," where may be used herein, are intended to mean either a direct or an indirect connection. Thus, if a first device couples, or is coupled to, a second device, that connection may be by way of a direct connection or through an indirect connection via other devices (or components) and connections.

Regarding, the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that includes the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or more," "ones or more," and/or "ones or mores" according to set theory, unless expressly specified otherwise.

The foregoing detailed description has been presented for purposes of illustration and description. It is not intended to be exhaustive or be limited to the precise form disclosed. Many modifications and variations are possible in light of the above description. The described embodiments were chosen to best explain the principles of the technology and its practical application to thereby enable others skilled in the art to best utilize the technology in various embodiments and with various modifications as are suited to the particular use contemplated. The scope of the technology is defined by the claims appended hereto.

What is claimed is:

1. A method of erasing a plurality of memory cells in a memory device, comprising the steps of:
preparing a memory device that includes a plurality of memory blocks, the memory blocks including respective first and second sub-blocks that can be programmed and erased independently of one another, the first and second sub-blocks including an array of memory cells arranged in a plurality of word lines; and
erasing the memory cells of a selected memory block of the plurality of memory blocks in at least one erase loop, the at least one erase loop including
simultaneously applying an erase voltage to a plurality of channels in the selected memory block, applying a first bias voltage to the plurality of word lines of the first sub-block, and applying a second bias voltage to the plurality of word lines of the second sub-block,
wherein the first bias voltage is different than the second bias voltage so that the memory cells of the first and second sub-blocks are erased at different speeds,
wherein the first sub-block is a lower sub-block on a source side of the memory block and the second sub-block is an upper sub-block on a drain side of the memory block,
wherein the at least one erase loop includes a plurality of erase loops, and wherein between erase loops
the first bias voltage that is applied to the word lines of the lower sub-block is adjusted by a first voltage step size, and
the second bias voltage that is applied to the word lines of the upper sub-block is adjusted by a second voltage step size,
wherein the first voltage step size is greater than the second voltage step size.

2. The method as set forth in claim 1, wherein the lower sub-block includes a plurality of lower memory holes and wherein the upper sub-block includes a plurality of upper memory holes.

3. The method as set forth in claim 2, wherein the at least one erase loop further includes the steps of:
performing an erase-verify operation on only the memory cells of the upper sub-block; and
performing an erase-verify operation on only the memory cells of the lower sub-block.

4. The method as set forth in claim 3, wherein in response to the memory cells of the lower sub-block passing the erase-verify operation, the method further includes the steps of, in at least one additional erase loop:
simultaneously applying an erase voltage to a plurality of channels in the selected memory block, applying an erase-inhibit voltage to the plurality of word lines of the lower sub-block, and applying the second bias voltage to the plurality of word lines of the upper sub-block.

5. The method as set forth in claim 4, wherein the at least one additional erase loop further including the steps of performing the erase-verify operation on only the memory cells of the upper sub-block; and
skipping the erase-verify operation for the memory cells of the lower sub-block.

6. A memory device, comprising:
a plurality of memory blocks, the memory blocks including respective first and second sub-blocks that can be programmed and erased independently of one another, and the first and second sub-blocks including an array of memory cells arranged in a plurality of word lines; and
control circuitry, the control circuitry being configured to erase the memory cells of a selected memory block of the plurality of memory blocks in at least one erase loop, in the at least one erase loop, the control circuitry being configured to;
simultaneously apply an erase voltage to a plurality of channels in the selected memory block, apply a first bias voltage to the plurality of word lines of the first sub-block, and apply a second bias voltage to the plurality of word lines of the second sub-block,
wherein the first bias voltage is different than the second bias voltage so that the memory cells of the first and second sub-blocks are erased at different speeds,
wherein the first sub-block is a lower sub-block on a source side of the memory block and the second sub-block is an upper sub-block on a drain side of the memory block,
wherein the at least one erase loop includes a plurality of erase loops, and wherein between erase loops, the control circuitry is configured to
adjust the first bias voltage that is applied to the word lines of the lower sub-block by a first voltage step size, and
adjust the second bias voltage that is applied to the word lines of the upper sub-block by a second voltage step size,
wherein the first voltage step size is greater than the second voltage step size.

7. The memory device as set forth in claim 6, wherein the lower sub-block includes a plurality of lower memory holes and wherein the upper sub-block includes a plurality of upper memory holes.

8. The memory device as set forth in claim 7, wherein during the at least one erase loop the control circuitry is further configured to:
   perform an erase-verify operation on only the memory cells of the upper sub-block; and
   perform an erase-verify operation on only the memory cells of the lower sub-block.

9. The memory device as set forth in claim 8, wherein in response to the memory cells of the lower sub-block passing the erase-verify operation, in at least one additional erase loop, the control circuitry is further configured to:
   simultaneously apply an erase voltage to a plurality of channels in the selected sub-memory block, apply an erase-inhibit voltage to the plurality of word lines of the lower sub-block, and apply the second bias voltage to the plurality of word lines of the upper sub-block.

10. The memory device as set forth in claim 9, wherein during the at least one additional erase loop, the control circuitry is further configured to:
    perform the erase-verify operation on only the memory cells of the upper sub-block; and
    skip the erase-verify operation for the memory cells of the lower sub-block.

11. An apparatus, comprising:
    a plurality of memory blocks, the memory blocks including respective first and second sub-blocks that can be programmed and erased independently of one another, the first and second sub-blocks including an array of memory cells arranged in a plurality of word lines, and the memory blocks each including a plurality of upper memory holes and a plurality of lower memory holes; and
    an erasing means for erasing the memory cells of a selected memory block of the plurality of memory blocks in at least one erase loop, in the at least one erase loop, the erasing means being configured to;
    simultaneously apply an erase voltage to a plurality of channels in the selected memory block, apply a first bias voltage to the plurality of word lines that are aligned with the plurality of lower memory holes, and apply a second bias voltage to the plurality of word lines that are aligned with the upper memory holes,
    wherein the first bias voltage is different than the second bias voltage so that the memory cells of the plurality of word lines that are aligned with the upper memory holes are erased at a different speed than the memory cells of the word lines that are aligned with the lower memory holes,
    wherein the at least one erase loop includes a plurality of erase loops, and wherein between erase loops, the erasing means is configured to
        adjust the first bias voltage that is applied to the word lines that are aligned with the lower memory holes by a first voltage step size, and
        adjust the second bias voltage that is applied to the word lines that are aligned with the upper memory holes by a second voltage step size,
        wherein the first voltage step size is greater than the second voltage step size.

12. The apparatus as set forth in claim 11, wherein the erasing means is further configured to:
    perform an erase-verify operation on only the memory cells of the word lines that are aligned with the upper memory holes; and
    perform an erase-verify operation on only the memory cells of the word lines that are aligned with the lower memory holes.

* * * * *